United States Patent
Holzheimer et al.

(10) Patent No.: US 9,616,370 B2
(45) Date of Patent: Apr. 11, 2017

(54) METHOD AND APPARATUS FOR INTRODUCING AUXILIARY MATERIAL

(75) Inventors: Jens Holzheimer, Tamm (DE); Dietmar Wieland, Waiblingen (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 1928 days.

(21) Appl. No.: 12/711,911

(22) Filed: Feb. 24, 2010

(65) Prior Publication Data

US 2010/0197213 A1  Aug. 5, 2010

Related U.S. Application Data

(63) Continuation of application No. PCT/EP2008/005482, filed on Jul. 4, 2008.

(30) Foreign Application Priority Data

Aug. 24, 2007 (DE) .......................... 10 2007 040 898

(51) Int. Cl.
  *B05B 15/12* (2006.01)
  *B01D 46/00* (2006.01)
  (Continued)

(52) U.S. Cl.
  CPC ..... *B01D 46/0035* (2013.01); *B01D 46/0041* (2013.01); *B01D 46/42* (2013.01);
  (Continued)

(58) Field of Classification Search
  CPC  B01D 46/0035; B01D 46/0041; B01D 46/42; B01D 46/46; B01D 2273/12;
  (Continued)

(56) References Cited

U.S. PATENT DOCUMENTS 4,094,654 A    6/1978  Prinzing
4,237,780 A *  12/1980 Truhan .................. B01D 46/12
                                                        110/102
(Continued)

FOREIGN PATENT DOCUMENTS

DE       70 14 4 33 U1    4/1970
DE       24 49 065 A1     4/1976
(Continued)

OTHER PUBLICATIONS

Translation of DE19924130.*
(Continued)

*Primary Examiner* — Gregory Huson
*Assistant Examiner* — Dana Tighe
(74) *Attorney, Agent, or Firm* — Leydig, Voit & Mayer, Ltd.

(57) ABSTRACT

In order to provide a method of introducing auxiliary material into the flow path of a crude gas stream charged with wet-paint overspray before the crude gas stream passes through at least one filter element for separating the overspray from the crude gas stream, with which method an introduction of auxiliary material into the application region of a paint shop is reliably prevented even in the event of incorrect operation, a method is proposed, which comprises the following method steps: detecting whether there is an adequate crude gas flow through the at least one filter element; and blocking the introduction of auxiliary material into the flow path of the crude gas stream if it is determined that there is not an adequate crude gas flow.

25 Claims, 24 Drawing Sheets

(51) Int. Cl.
*B01D 46/42* (2006.01)
*G01F 23/26* (2006.01)
*B01D 46/46* (2006.01)
*B05B 13/04* (2006.01)

(52) U.S. Cl.
CPC .......... *B01D 46/46* (2013.01); *B05B 15/1255* (2013.01); *G01F 23/263* (2013.01); *B01D 2273/12* (2013.01); *B05B 13/0452* (2013.01); *Y02P 70/36* (2015.11)

(58) Field of Classification Search
CPC ............ B05B 15/1255; B05B 13/0452; G01F 23/263; Y02P 70/36
USPC .................................. 454/49, 50, 56, 54, 55
See application file for complete search history.

(56) References Cited

U.S. PATENT DOCUMENTS

| | | | |
|---|---|---|---|
| 4,417,541 A | | 11/1983 | Schäfer |
| 4,607,592 A | * | 8/1986 | Richter .................. 118/689 |
| 4,824,295 A | * | 4/1989 | Sharpless ................ 406/109 |
| 4,963,778 A | * | 10/1990 | Jensen et al. ............. 310/68 D |
| 5,020,470 A | | 6/1991 | West et al. |
| 5,205,869 A | * | 4/1993 | Ahern .................... 118/324 |
| 5,591,240 A | | 1/1997 | Ophardt et al. |
| 5,743,958 A | * | 4/1998 | Shutic .................... 118/308 |
| 6,093,250 A | * | 7/2000 | Salazar ............... B05B 15/1262 118/326 |
| 6,887,293 B1 | * | 5/2005 | Abad et al. .................. 55/385.2 |
| 2002/0020347 A1 | | 2/2002 | Gerlain |
| 2005/0019106 A1 | | 1/2005 | Moser |
| 2005/0095071 A1 | | 5/2005 | Kleineidam et al. |
| 2008/0229925 A1 | | 9/2008 | Wieland et al. |
| 2008/0229926 A1 | | 9/2008 | Wieland et al. |
| 2009/0209188 A1 | | 8/2009 | Wieland et al. |

FOREIGN PATENT DOCUMENTS

| | | |
|---|---|---|
| DE | 81 15 387 U1 | 12/1981 |
| DE | 39 25 818 A1 | 2/1991 |
| DE | 42 11 465 A1 | 10/1993 |
| DE | 43 03 753 A1 | 8/1994 |
| DE | 196 10 566 A1 | 9/1994 |
| DE | 295 08 187 U1 | 7/1995 |
| DE | 694 04 175 T2 | 10/1997 |
| DE | 197 36 331 A1 | 10/1998 |
| DE | 695 04 511 T2 | 5/1999 |
| DE | 299 07 779 U1 | 7/1999 |
| DE | 100 28 553 A1 | 12/2001 |
| DE | 101 09 574 C2 | 9/2002 |
| DE | 101 30 173 A1 | 1/2003 |
| DE | 197 05 523 C2 | 1/2003 |
| DE | 202 18 192 U1 | 3/2003 |
| DE | 202 20 435 U1 | 7/2003 |
| DE | 103 41 979 A1 | 3/2005 |
| DE | 103 50 332 A1 | 5/2005 |
| DE | 103 61 266 A1 | 7/2005 |
| DE | 199 24 130 B4 | 8/2005 |
| DE | 10 2005 048 579 A1 | 4/2007 |
| EP | 0 415 511 A1 | 3/1991 |
| EP | 0 761 577 A1 | 3/1997 |
| EP | 1 512 465 A1 | 3/2005 |
| EP | 1 427 536 B1 | 8/2005 |
| EP | 1 704 925 A2 | 9/2006 |
| EP | 1 704 926 A2 | 9/2006 |
| GB | 2 035 834 A | 6/1980 |
| JP | 49-047227 A | 11/1975 |
| JP | 52-020524 A | 5/1977 |
| JP | 53-109274 A | 9/1978 |
| JP | 56-048263 A | 5/1981 |
| JP | 59-206075 A | 11/1984 |
| JP | 02-123025 A | 5/1990 |
| JP | 06-278868 A | 10/1994 |
| JP | 07-037311 U | 7/1995 |
| JP | 10-296026 A | 11/1998 |
| JP | 2001-046821 A | 2/2001 |
| JP | 2008-536661 T | 9/2008 |
| JP | 2009-509760 A | 3/2009 |
| WO | WO 03/024612 A1 | 3/2003 |
| WO | WO 2004/087331 A1 | 10/2004 |
| WO | WO 2006/099999 A1 | 9/2006 |
| WO | WO 2006/100001 A1 | 9/2006 |
| WO | WO 2007/039275 A1 | 4/2007 |
| WO | WO 2007/039276 A1 | 4/2007 |
| WO | WO 2009/026987 A1 | 3/2009 |

OTHER PUBLICATIONS

Japanese Patent Office, Examination Report in Japanese Patent Application No. 2010-521323 (Jul. 24, 2012).
Examination Report for DE 10 205 013 711.3 dated Nov. 10, 2005.
Examination Report for DE 10 2005 048 579.0 dated Mar. 15, 2006.
Examination Report for DE 10 2005 048 580.4 dated Mar. 15, 2006.
International Search Report dated Nov. 3, 2008 for PCT/EP2008/005482.

* cited by examiner

METHOD AND APPARATUS FOR INTRODUCING AUXILIARY MATERIAL

RELATED APPLICATION

This application is a continuation application of PCT/EP2008/005482 filed Jul. 4, 2008, the entire specification of which is incorporated herein by reference.

FIELD OF THE DISCLOSURE

The present invention relates to a method of introducing auxiliary material into the flow path of a crude gas stream charged with wet-paint overspray before the crude gas stream passes through at least one filter element for separating the overspray from the crude gas stream.

BACKGROUND

Such a method is known for example from DE 10 2005 048 579 A1.

With this known apparatus the dry separation of the wet-paint overspray from the crude gas stream of a spray booth is effected in a filtering apparatus after a flowable, particulate auxiliary material, known as a "precoat" material, has previously been delivered into the crude gas stream by means of a nozzle arrangement.

The purpose of this auxiliary material is to deposit as a barrier layer on the surfaces of the filter element in order to prevent these areas from becoming clogged by adhering overspray particles. By periodic cleaning of the filter elements of the filtering apparatus the mixture of auxiliary material and wet-paint overspray passes from the filter elements into an auxiliary-material receiving container, from which it may be extracted in order to be fed to the nozzle arrangement for reuse as auxiliary material. The mixture of auxiliary material and wet-paint overspray that is situated in the auxiliary-material receiving container may moreover be swirled up by means of compressed air pulses from a compressed air lance so that it may then rise from the auxiliary-material receiving container up to the filter elements and deposit there.

With this known method there is a risk that in the event of improper operation auxiliary material may pass into the application region of a paint shop, in which the crude gas stream is charged with the wet-paint overspray.

SUMMARY OF THE INVENTION

The underlying object of the present invention is to provide a method of the initially described type, with which an introduction of auxiliary material into the application region of a paint shop is reliably prevented even in the event of improper operation.

In a method having the features of the preamble of claim 1 this object is achieved according to the invention by the following method steps:

detecting whether there is an adequate crude gas flow through the at least one filter element; and blocking the introduction of auxiliary material into the flow path of the crude gas stream if it is determined that there is not an adequate crude gas flow.

Here, by an adequate crude gas flow is meant a crude gas flow whereby a predetermined minimum quantity of crude gas per unit of time passes through the at least one filter element for separating the overspray.

If there is not such an adequate crude gas flow through the at least one filter element, there is the risk that auxiliary material introduced into the flow path of the crude gas stream will pass counter to the normal flow direction into the application region of the paint shop.

By virtue of the blocking according to the invention of the introduction of auxiliary material into the flow path of the crude gas stream in the absence of an adequate crude gas flow, even in the event of such a malfunction an introduction of auxiliary material into the application region of the paint shop is reliably prevented.

If an introduction of auxiliary material into the flow path of the crude gas stream is effected by swirling up auxiliary material situated in an auxiliary-material receiving container by means of a swirling device, then in the absence of an adequate crude gas flow preferably the operation of the swirling device is blocked.

If an introduction of auxiliary material into the flow path of the crude gas stream is effected by cleaning auxiliary material off at least one filter element, then in the absence of an adequate crude gas flow preferably the cleaning of the at least one filter element is blocked.

If an introduction of auxiliary material into the flow path of the crude gas stream is effected by supplying by means of a nozzle arrangement, then in the absence of an adequate crude gas flow preferably the operation of the nozzle arrangement is blocked.

For detecting the absence of an adequate crude gas flow there are a number of possibilities.

It may for example be provided that the absence of an adequate crude gas flow is detected on the basis of a pressure drop at least one filter element. If the measured pressure drop is too low, then there is not an adequate crude gas flow.

Alternatively or in addition thereto, the absence of an adequate crude gas flow may be detected on the basis of an operating state of a blower that is disposed downstream of the at least one filter element.

For this purpose, the operating state of the blower may be monitored for example by means of current monitoring, by means of a frequency converter and/or by means of measuring the pressure drop at the blower.

Alternatively or in addition thereto, the absence of an adequate crude gas flow may be detected also by means of a flow meter, which may in particular be disposed downstream of the at least one filter element.

The method according to the invention prolongs the stability of the process in the event of abnormal occurrences and is used to protect sensitive paint shop components in the event of malfunctions.

The method according to the invention is suitable for use in a dry wet-paint overspray separating system for spray booths in the automobile industry and in the general field of industrial paint shops in order to maintain the painting process and avoid or at least reduce damage.

The present invention further relates to an apparatus for introducing auxiliary material into the flow path of a crude gas stream charged with wet-paint overspray before the crude gas stream passes through at least one filter element for separating the overspray from the crude gas stream.

The underlying object of the present invention is to provide such an apparatus, with which an introduction of auxiliary material into the application region of a paint shop is reliably prevented even in the event of malfunctions.

In an apparatus having the features of the preamble of claim 11 this object is achieved according to the invention in that the apparatus comprises the following:

a detection device for detecting whether there is an adequate crude gas flow through the at least one filter element; and a blocking device for blocking the introduction of auxiliary material into the flow path of the crude gas stream if the detection device determines the absence of an adequate crude gas flow.

In this case, the apparatus may in particular comprise a control apparatus that is used as a detection device for detecting whether there is an adequate crude gas flow and/or as a blocking device for blocking the introduction of auxiliary material into the flow path of the crude gas stream.

Further special developments of the apparatus according to the invention are the subject matter of claims 13 to 21, the features and advantages of which have already been explained above in connection with the special developments of the method according to the invention.

The apparatus according to the invention for introducing auxiliary material into the flow path of a crude gas stream charged with wet-paint overspray is particularly suitable for use in an apparatus for separating wet-paint overspray from a crude gas stream containing overspray particles, which apparatus comprises at least one filter element for separating the overspray from the crude gas stream as well as at least one apparatus according to the invention for introducing auxiliary material into the flow path of the crude gas stream charged with wet-paint overspray.

An apparatus according to the invention for separating wet-paint overspray is particularly suitable for use in an installation for painting articles, in particular vehicle bodies, which comprises at least one application region for applying wet paint onto the articles to be painted as well as at least one apparatus according to the invention for separating wet-paint overspray.

Further features and advantages of the invention are the subject matter of the following description and of the graphical representation of embodiments.

DETAILED DESCRIPTION OF THE INVENTION

Figure 1:
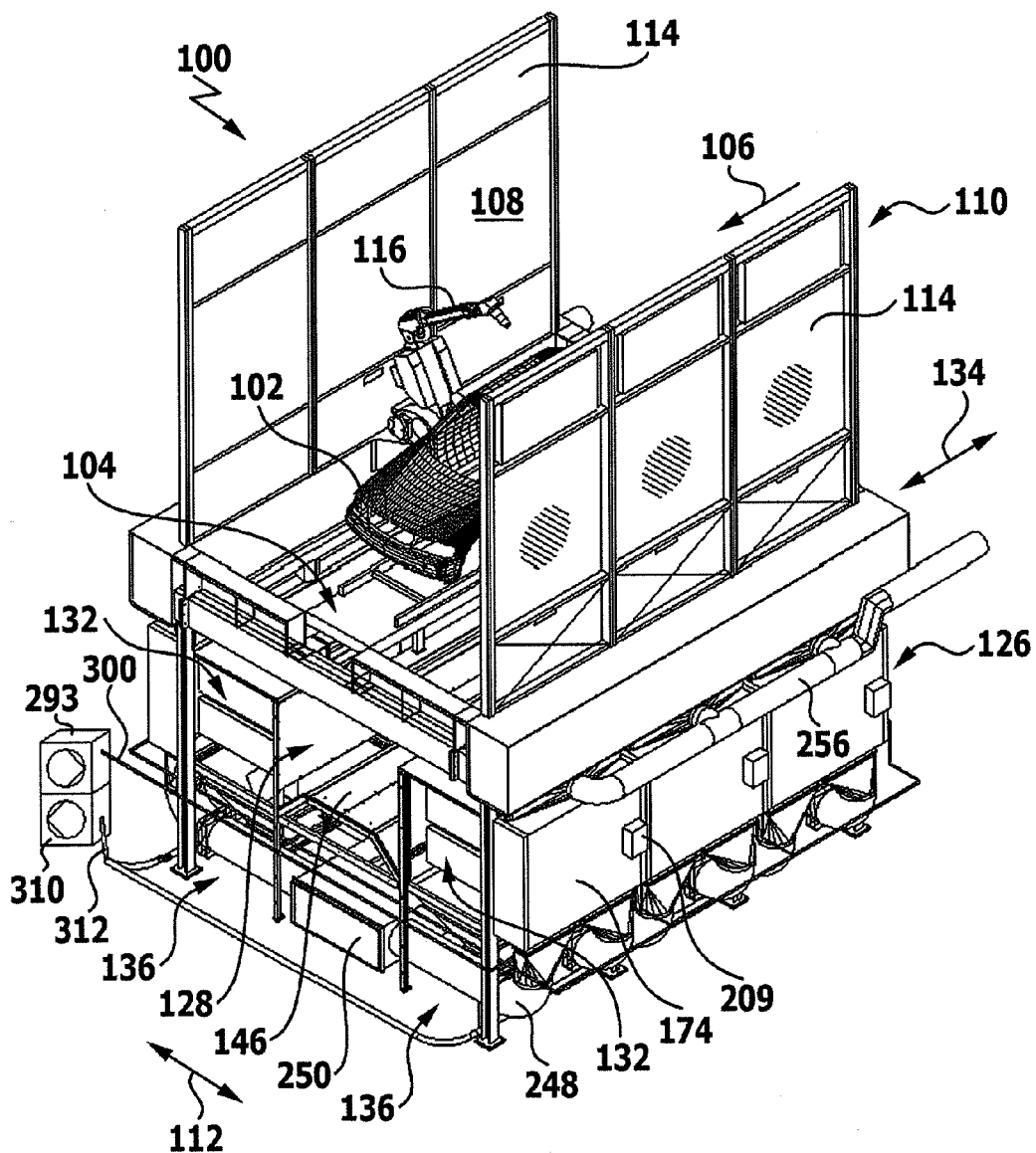
FIG. 1 a diagrammatic perspective view of a spray booth, below which an apparatus for separating wet-paint overspray from a crude gas stream containing overspray particles is disposed, which comprises a flow chamber disposed under the spray booth and three filter modules on each side of the flow chamber.

An installation for spray-painting vehicle bodies 102, which is illustrated in FIGS. 1 to 19 and denoted as a whole by 100, comprises a purely diagrammatically illustrated conveying apparatus 104, by means of which the vehicle bodies 102 may be moved along a conveying direction 106 through an application region 108 of a spray booth denoted as a whole by 110.

The application region 108 is the interior of the spray booth 110, which in a horizontal transverse direction 112 extending at right angles to the conveying direction 106, which corresponds to the longitudinal direction of the spray booth 110, is delimited on either side of the conveying apparatus 104 by a booth wall 114.

In the spray booth 110 spray-painting devices 116, for example in the form of painting robots, are disposed on both sides of the conveying apparatus 104.

Figure 3:
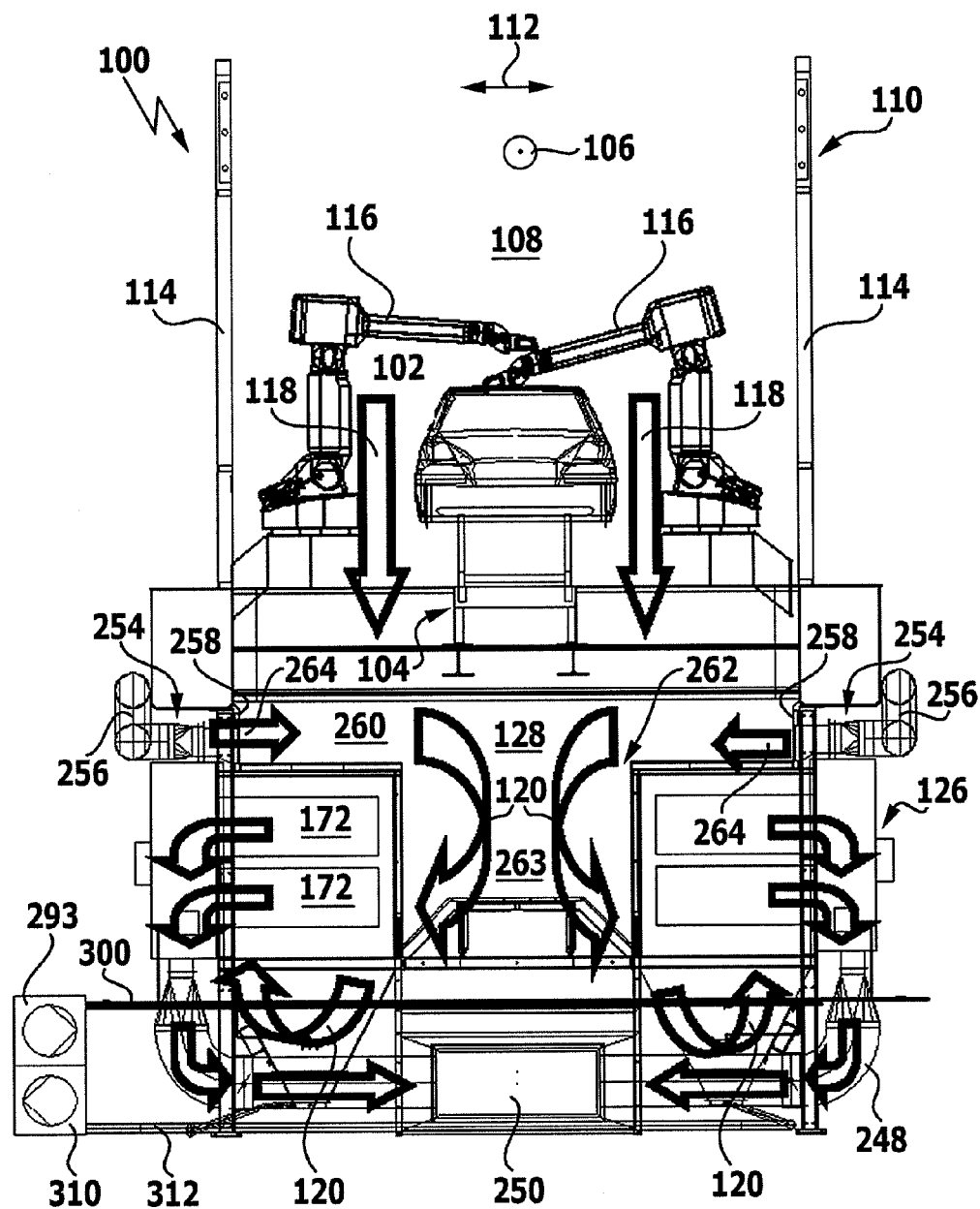
FIG. 3 a diagrammatic vertical cross section as in FIG. 2 through the installation of FIG. 1, wherein in addition the respective flow directions of the crude gas, of the outlet air leaving the filter modules and of the inlet air supplied into the flow chamber to generate transverse air curtains are indicated by arrows.
Figure 4:
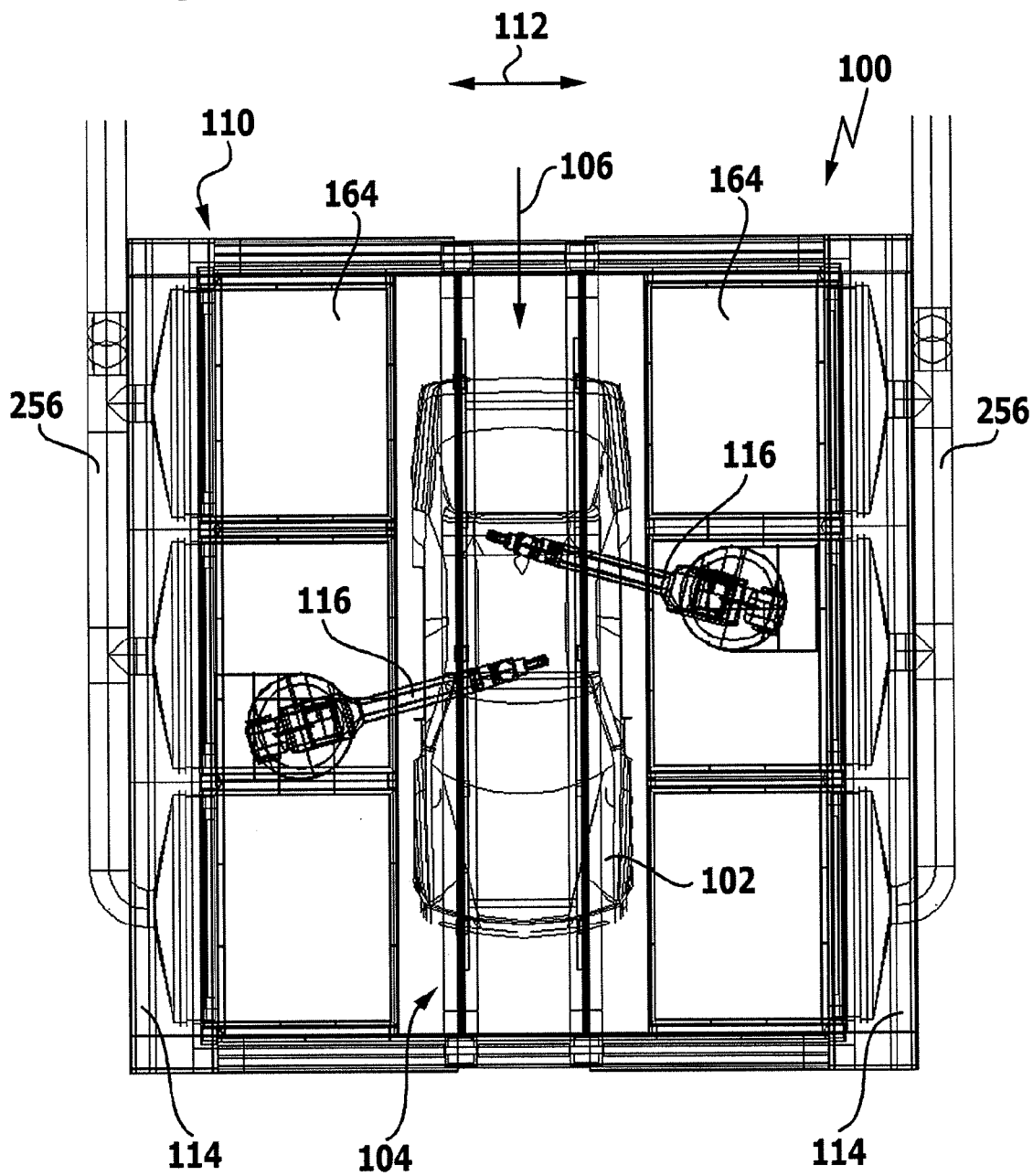
FIG. 4 a diagrammatic top view of the installation of FIGS. 1 to 3.
Figure 5:
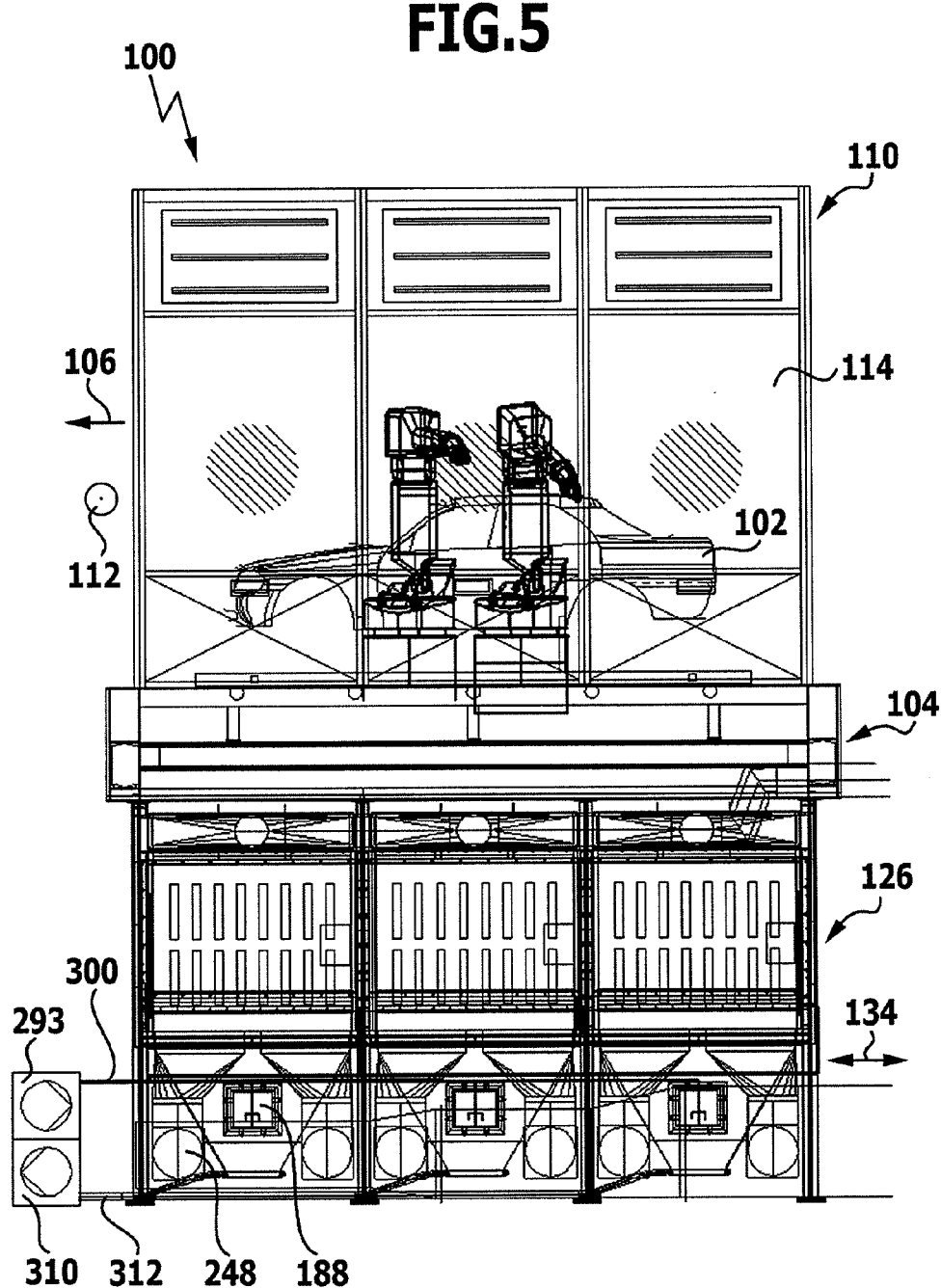
FIG. 5 a diagrammatic side view of the installation of FIGS. 1 to 4.

By means of a recirculation air circuit (illustrated only in sections) an air stream is generated, which passes through the application region 108 substantially vertically from top to bottom, as is indicated by the arrows 118 in FIG. 3.

In the application region 108 this air stream picks up paint overspray in the form of overspray particles. The term "particle" in the present context includes both solid and liquid particles, in particular droplets.

In the case of use of wet paint, the wet-paint overspray consists of paint droplets. Most of the overspray particles have a maximum dimension in the region of ca. 1 μm to ca. 100 μm.

Figure 10:
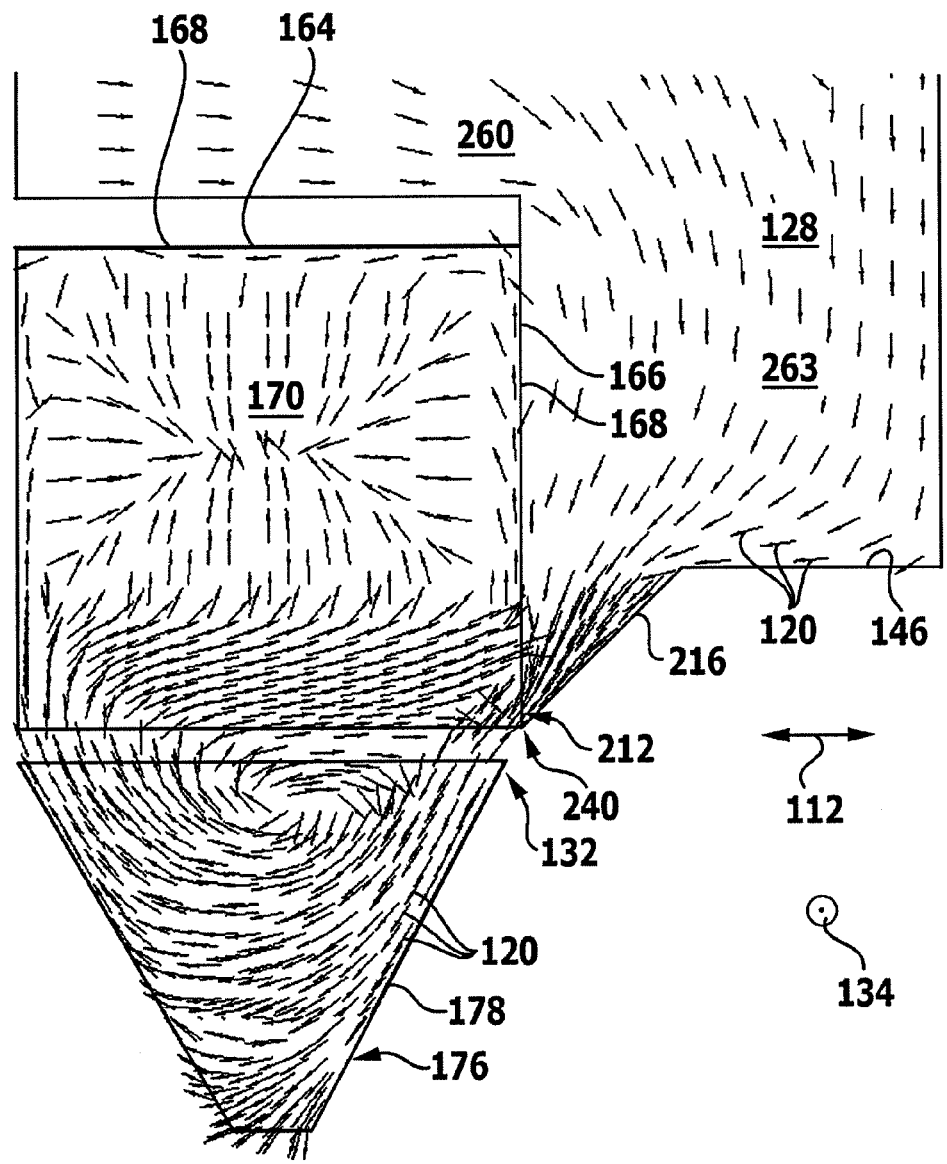
FIG. 10 a diagrammatic vertical cross section through a filter module and the adjoining region of the flow chamber, in which region the respective local flow direction of the crude gas stream is indicated by arrows.
Figure 11:
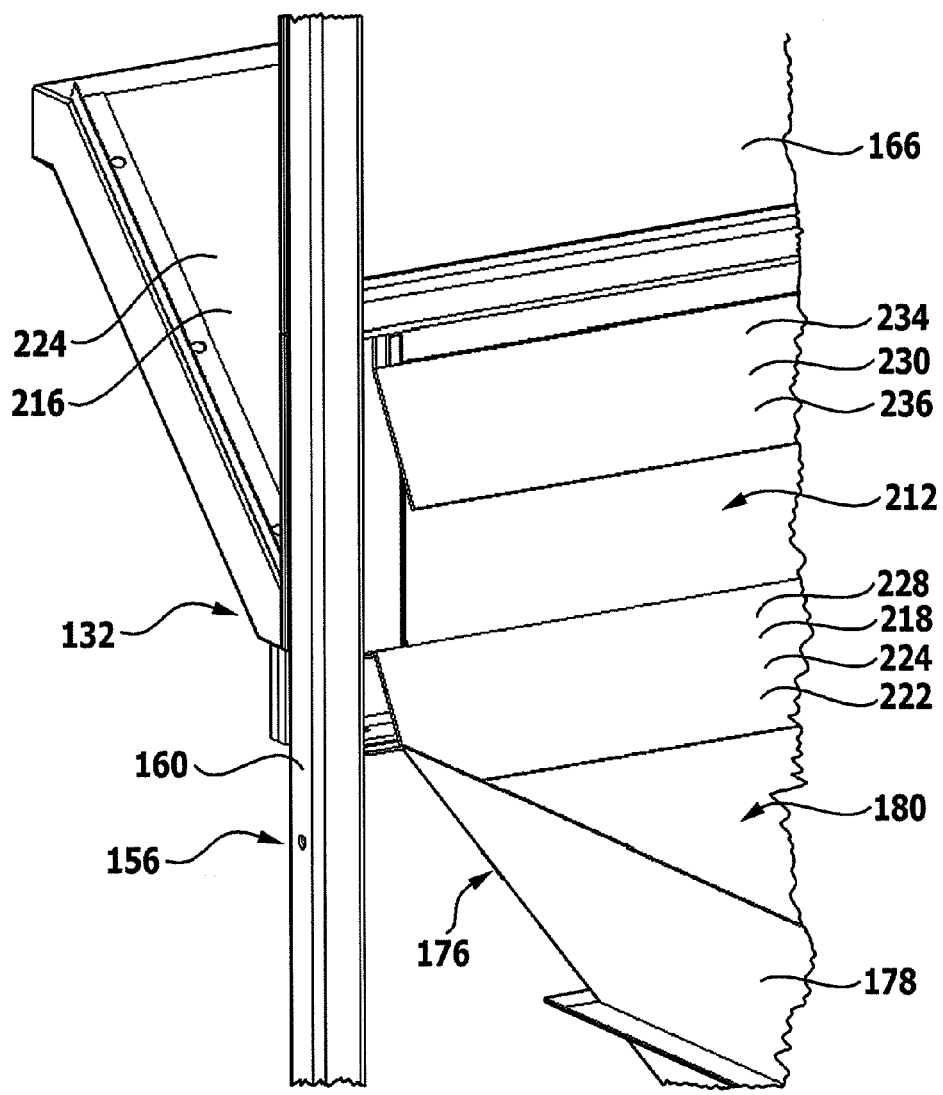
FIG. 11 a diagrammatic perspective representation of an edge region of an inlet opening of a filter module.

In the following, the outlet air stream charged with the overspray particles from the application region 108 is referred to as the crude gas stream. The flow direction of the crude gas stream is illustrated in FIGS. 3 and 10 by arrows 120.

The crude gas stream leaves the spray booth 110 in a downward direction and passes into an apparatus for separating wet-paint overspray from the crude gas stream that is denoted as a whole by 126 and is disposed underneath the application region 108.

The apparatus 126 comprises a substantially cuboidal flow chamber 128, which extends in the conveying direction 106 over the entire length of the spray booth 110 and is delimited in the transverse direction 112 by vertical side walls 130, which are substantially aligned with the side booth walls 114 of the spray booth 110, with the result that the flow chamber 128 has substantially the same horizontal cross-sectional area as the spray booth 110 and is disposed substantially entirely within the vertical projection of the base of the spray booth 110.

Figure 6:
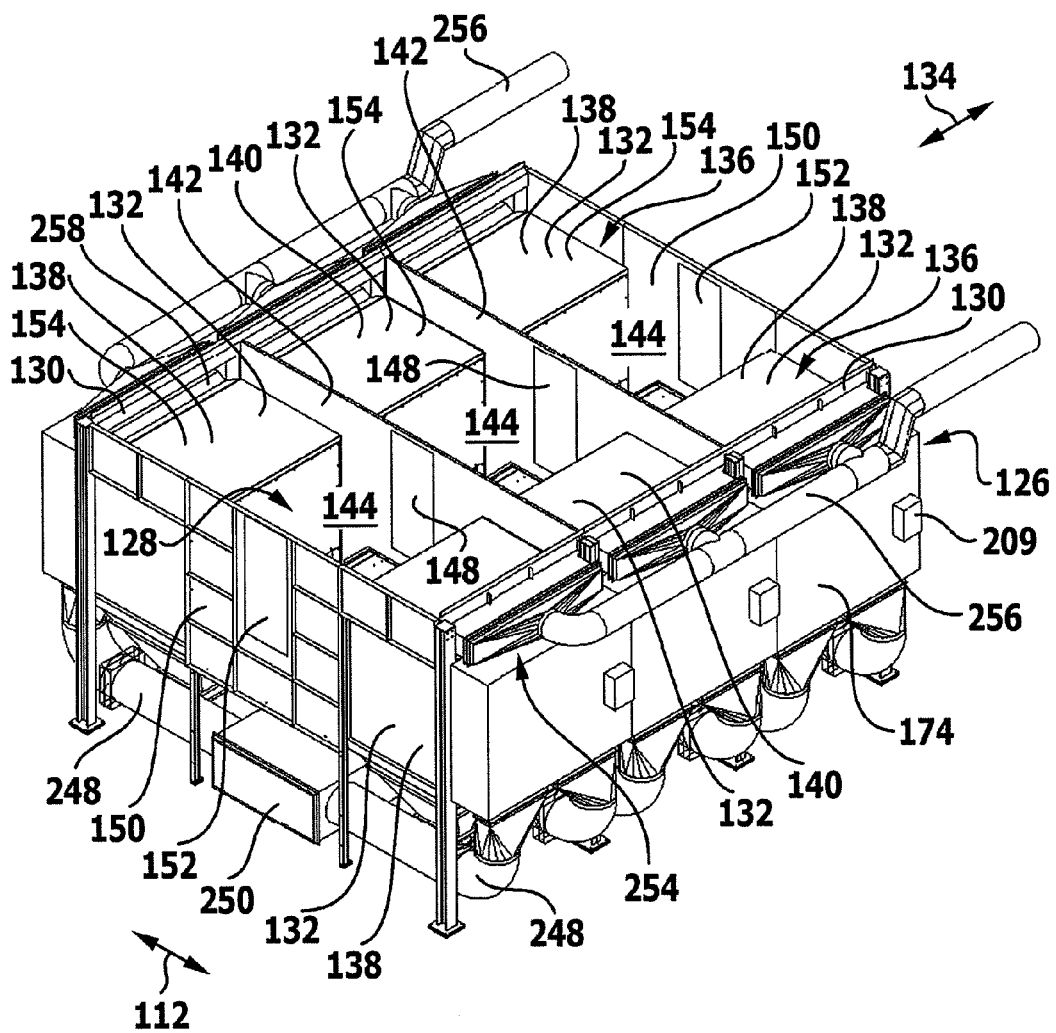
FIG. 6 a diagrammatic perspective representation of the apparatus for separating wet-paint overspray from a crude gas stream containing overspray particles, which apparatus is disposed under the spray booth of the installation of FIGS. 1 to 5 and has transverse dividing walls that subdivide the flow chamber into portions disposed successively along the longitudinal direction of the flow chamber.

As may best be seen from FIG. 6, on each side of the flow chamber 128 a plurality of, for example three, filter modules 132 are disposed, which form two module rows 136 extending in the longitudinal direction 134 (which is identical to the conveying direction 106) of the apparatus 126 for separating wet-paint overspray.

Each of the module rows 136 comprises two corner modules 138, which form in each case one end of a module row 136, and at least one middle module 140 that is disposed between two adjacent filter modules 132.

For preventing longitudinal flows of the crude gas stream in the longitudinal direction 134 of the flow chamber 128 and for preventing flows of the crude gas between the individual filter modules 132, vertical transverse dividing walls 142 extending in the transverse direction 112 may be provided, which are disposed between in each case two filter modules 132 disposed successively in the longitudinal direction 134 and subdivide the flow chamber 128 into flow chamber portions 144 disposed successively along the longitudinal direction 134.

By means of these transverse dividing walls 142 a defined adjustment of the crude gas flow for each individual filter module 132 is possible independently of the crude gas flow through the other filter modules 132.

Figure 2:
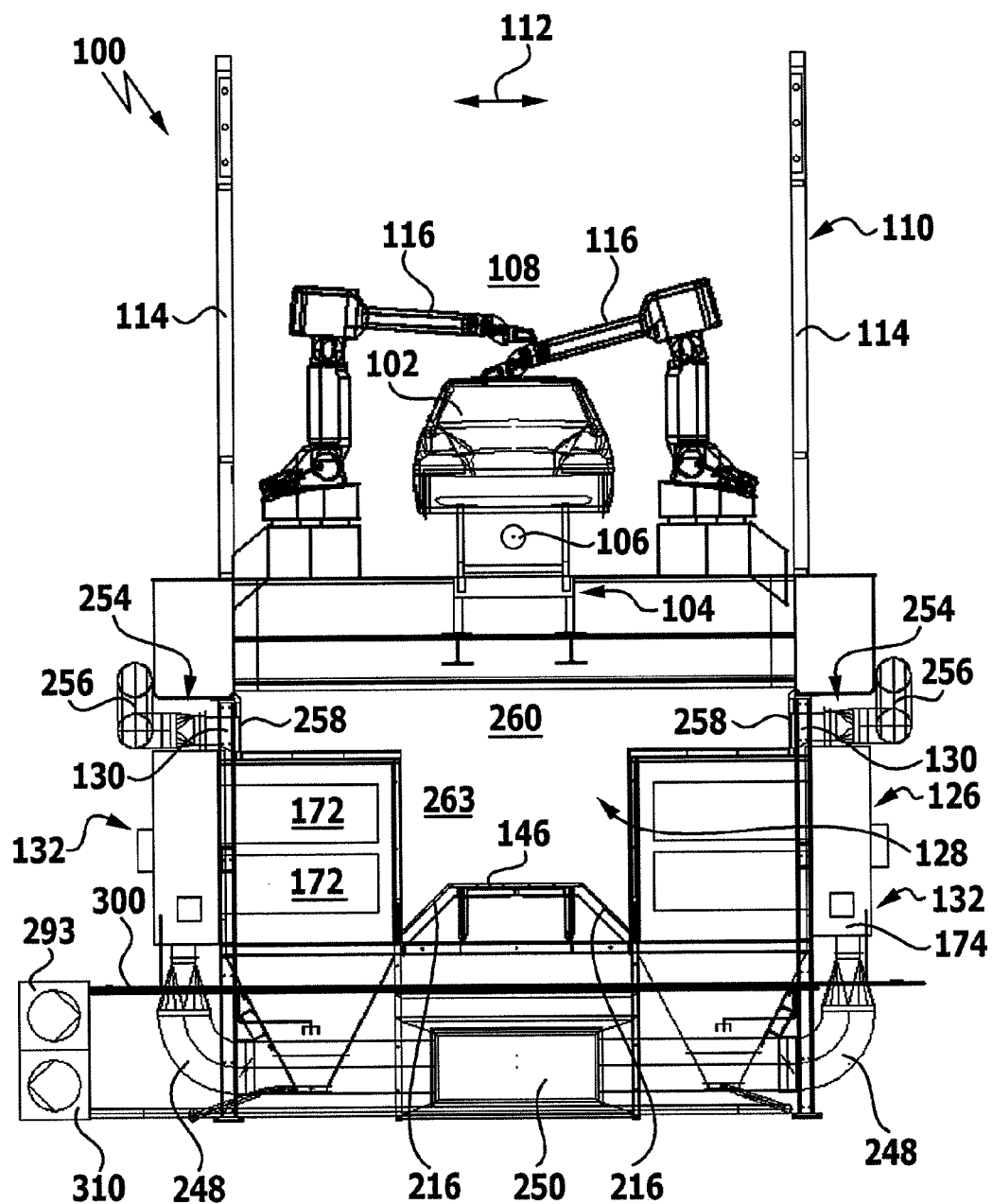
FIG. 2 a diagrammatic vertical cross section through the installation of FIG. 1.

As may best be seen from FIG. 2, a walkway 146 that is accessible by an operator is provided between the two module rows 136.

To allow continuous access to the portions of the walkway 146 that are disposed in the successive flow chamber portions 144, through-doors 148 are provided in the transverse dividing walls 142 (FIG. 6).

The end walls 150 of the flow chamber 128 that close off the flow chamber 128 at its front end and at its rear end are provided with access doors 152, through which an operator may pass from outside into the flow chamber 128.

Each of the filter modules 132 takes the form of a preassembled unit 154 that is manufactured at a location remote from the installation site of the paint shop and transported as a unit to the installation site of the paint shop. At the installation site the preassembled unit 154 is arranged in the intended working position and connected to one or more adjacent preassembled units 154 or to the transverse dividing walls 142 therebetween and to a support structure of the application region 108.

There now follows a description of the construction of a filter module 132 using the example of a middle module 140 and with reference to FIGS. 7 and 9 to 16.

Figure 7:
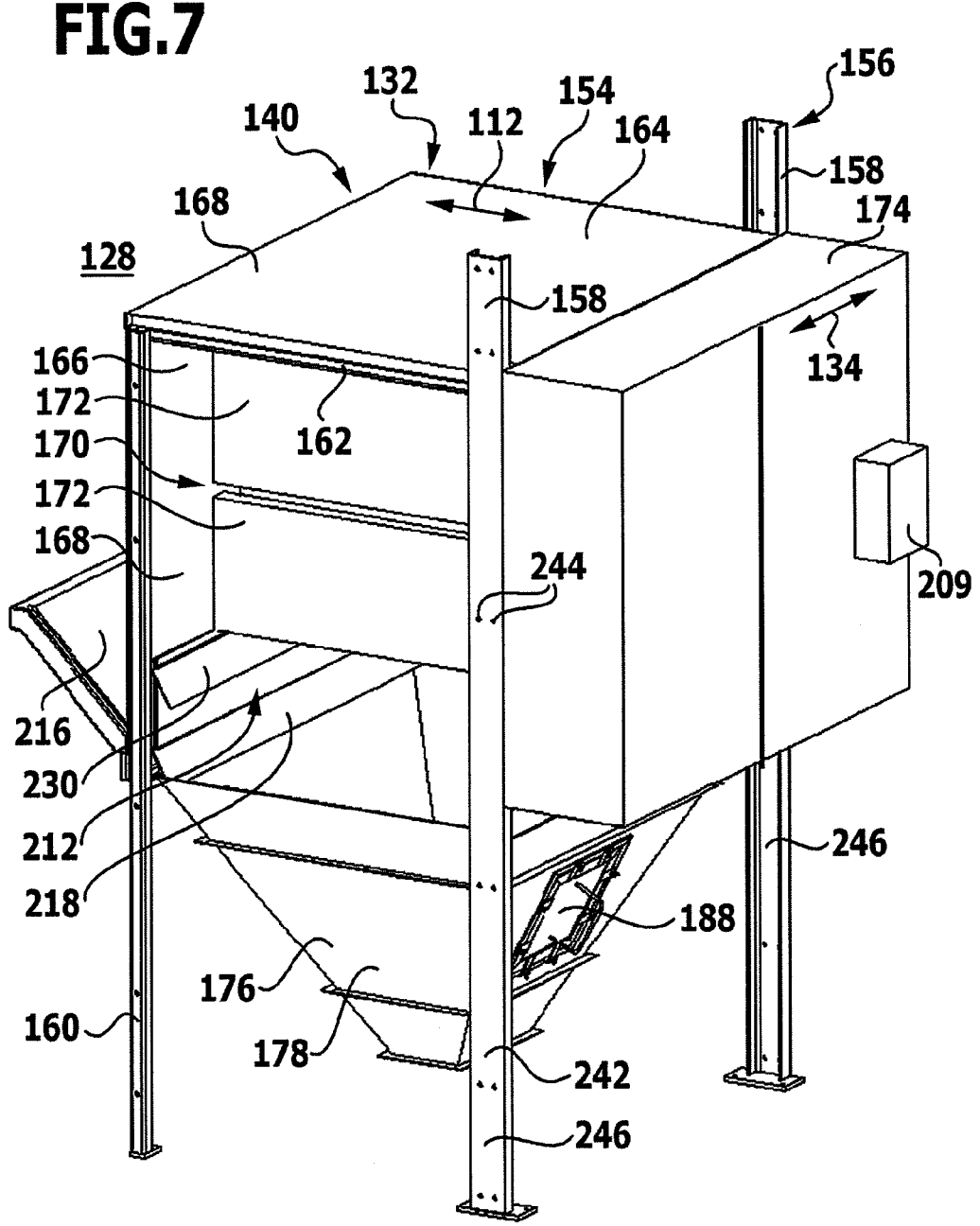
FIG. 7 a diagrammatic perspective representation of an individual filter module (middle module) that is provided for arrangement between two adjacent further filter modules.

The module comprises a support structure 156 consisting of two vertical rear supports 158 and two vertical front supports 160, which are connected at their upper end by horizontal transverse struts 162 to in each case one of the rear supports 158 (FIG. 7).

The front supports 160 are moreover connected to one another at their upper ends by means of a further transverse strut (not shown).

The rear supports 158 are also connected to one another by means of transverse struts (not shown) or by means of a connecting frame (not shown).

The transverse struts at the upper end of the support structure 156 carry a horizontal top wall 164.

Mounted on the fronts of the front supports 160 is a vertical front wall 166 of the filter module 132.

The top wall 164 and the front wall 166 form dividing walls 168 of the filter module 132, which separate a filter-element receiving space 170 disposed inside the filter module 132 from the region of the flow chamber 128 situated outside of the filter module 132.

In the filter-element receiving space 170 of the filter module 132 a plurality of, for example ten, filter elements 172 are arranged in two rows one above the other and project in horizontal direction from a common basic body 174, which is mounted on the rear sides of the rear supports 158.

The filter elements 172 may for example take the form of plates of sintered polyethylene, which at their outer face are provided with a membrane of polytetrafluoroethylene (PTFE).

The PTFE coating is used to raise the filter grade of the filter elements 172 (i.e. reduce their permeability) and moreover to prevent permanent adherence of the wet-paint overspray that is separated from the crude gas stream.

Both the basic material of the filter elements 172 and the PTFE coating thereof have a porosity that allows the crude gas to pass through the pores into the interior of the respective filter element 172.

To prevent clogging of the filter surfaces, these are moreover provided with a barrier layer of auxiliary material, which is discharged into the crude gas stream. This preferably particulate auxiliary material is conventionally known as "precoat" material.

The barrier layer develops during operation of the apparatus 126 in that the auxiliary material discharged into the crude gas stream deposits on the filter surfaces and prevents the filter surfaces from becoming clogged by the adherence of wet-paint overspray.

Auxiliary material from the crude gas stream 120 also settles on the insides of the top wall 164 and of the front wall 166 of the filter module 132, where it likewise prevents an adherence of wet-paint overspray.

As auxiliary material it is possible to use basically any medium that is capable of taking up the liquid component of the wet-paint overspray.

In particular, possible auxiliary materials are for example lime, rock meal, aluminium silicates, aluminium oxides, silicon oxides, coating powder or the like.

Alternatively or in addition thereto, as auxiliary material for taking up and/or binding the overspray it is also possible to use particles that have a cavity structure and a large internal surface relative to their external dimensions, for example zeolites or other hollow, for example spherical bodies made of polymers, glass or aluminium silicate and/or natural or synthetically produced fibres.

Alternatively or in addition thereto, as auxiliary material for taking up and/or binding the overspray it is also possible to use particles that react chemically with the overspray, for example chemically reactive particles of amine-, epoxide-, carboxyl-, hydroxyl- or isocyanate groups, chemically reactive particles of aluminium oxide after-treated with octyl silane, or solid or liquid monomers, oligomers or polymers, silanes, silanols or siloxanes.

The auxiliary material preferably comprises a plurality of auxiliary material particles that have a mean diameter in the region of for example ca. 10 μm to ca. 100 μm.

Figure 13:
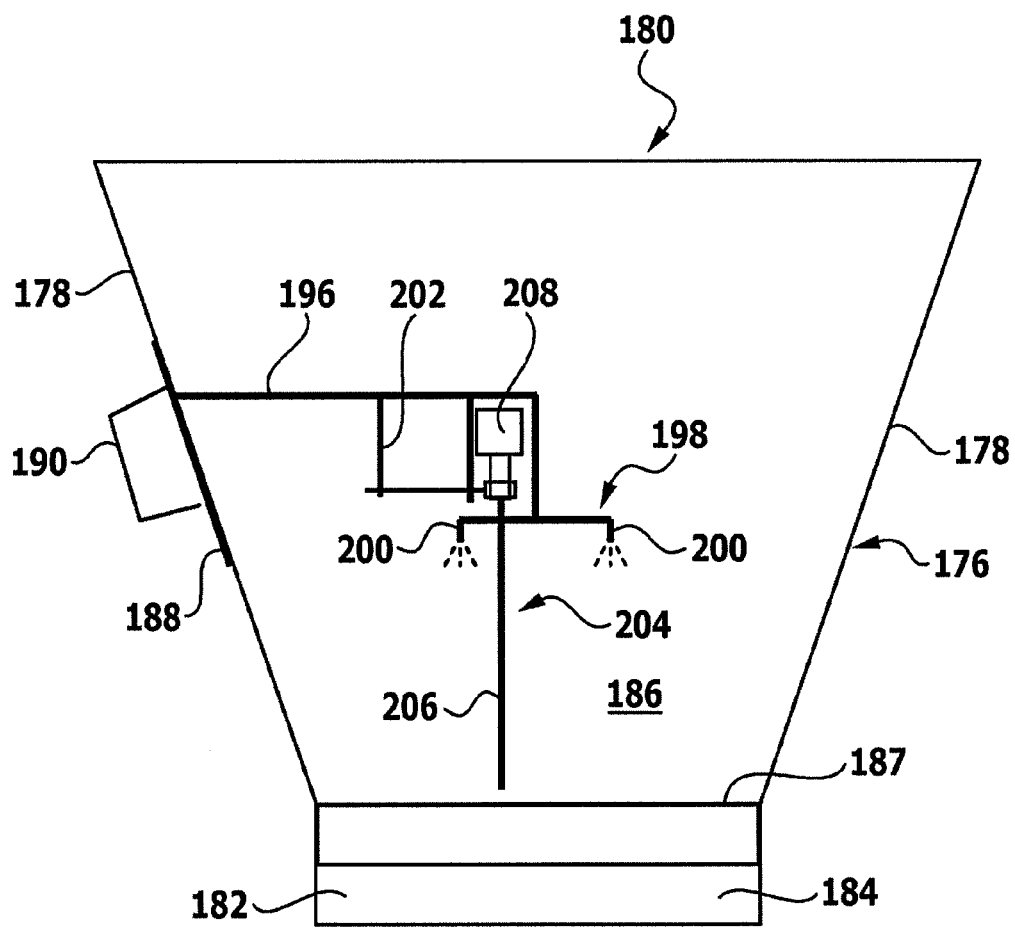
FIG. 13 a diagrammatic vertical section through an auxiliary-material receiving container having a level sensor and swirling device disposed in the interior of the container.

In order to be able to add the auxiliary material to the crude gas stream without the risk of the auxiliary material passing into the application region 108 of the paint shop 100, each filter module 132 is provided with an auxiliary-material receiving container 176, which is mounted on the support structure 156 and has for example a funnel-like shape in the form of an inverted truncated pyramid (FIG. 13).

The four trapezoidal side walls 178 of the auxiliary-material receiving container 176 are inclined at an angle of at least ca. 60° relative to the vertical.

The height of the auxiliary-material receiving container 176 is for example ca. 1.1 m.

The top edges of the side walls 178 surround an access opening 180 of the auxiliary-material receiving container 176, through which the crude gas stream 120 charged with overspray may enter into and escape from the auxiliary-material receiving container 176.

The substantially horizontally aligned base 182 takes the form of a porous fluid bed 184 that may be flushed through by a gaseous medium, in particular by compressed air, in order to fluidize the auxiliary material disposed in the interior 186 of the auxiliary-material receiving container 176 and even out locally different filling heights of the auxiliary material inside the auxiliary-material receiving container 176.

During operation of the installation 100 the fluid bed is set in operation intermittently, for example three times per minute for in each case ca. two seconds.

Figure 16:
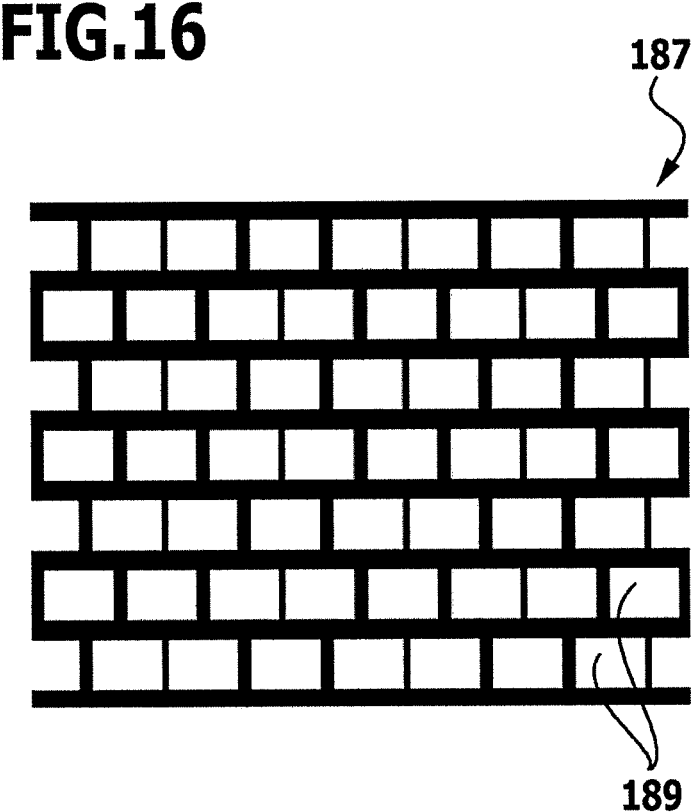
FIG. 16 a diagrammatic top view of a collecting screen disposed in the auxiliary-material receiving container of FIG. 13.

To prevent the fluid bed 184 from being damaged by falling larger articles, there is disposed at a spacing of for example 20 cm above the fluid bed 184 a collecting screen or retention screen 187, which extends in horizontal direction over the entire cross section of the interior 186 of the auxiliary-material receiving container 176 and comprises a plurality of rows of honeycomb-shaped or rectangular through-openings 189 for the passage of auxiliary material through the retention screen 187. The through-openings 189 are arranged mutually offset from row to row and have a size of for example ca. 30 mm×30 mm (FIG. 16).

Figure 14:
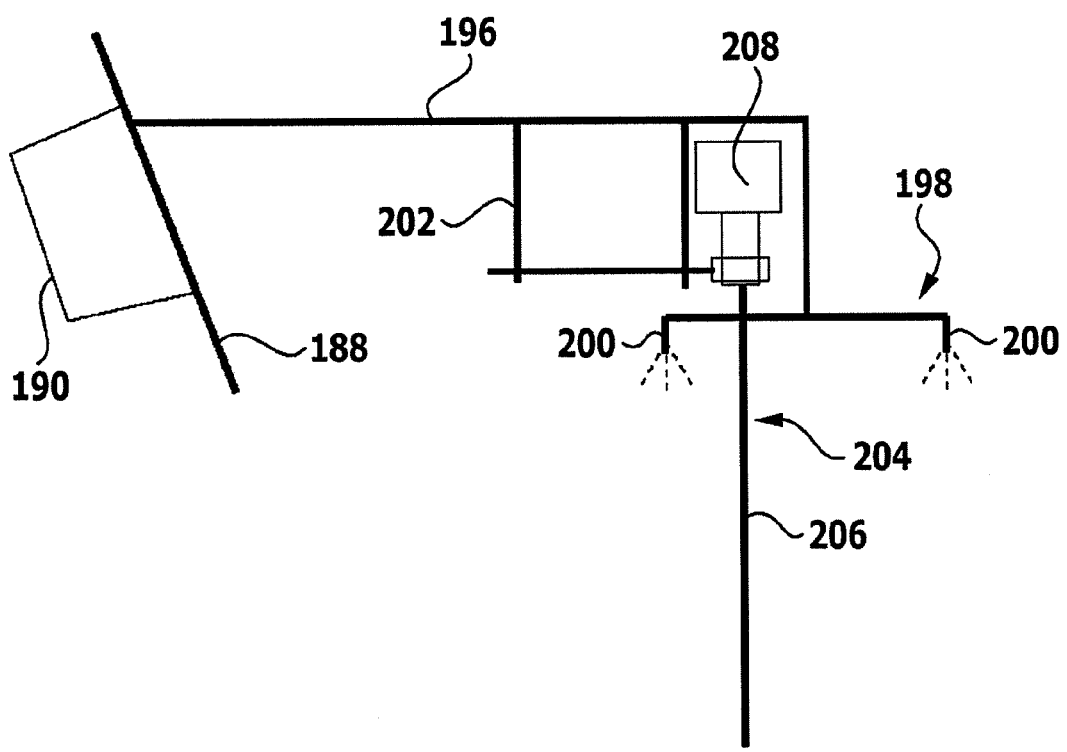
FIG. 14 a diagrammatic side view of an inspection door of the auxiliary-material receiving container of FIG. 13, with a level sensor and swirling device mounted on the inspection door.
Figure 15:
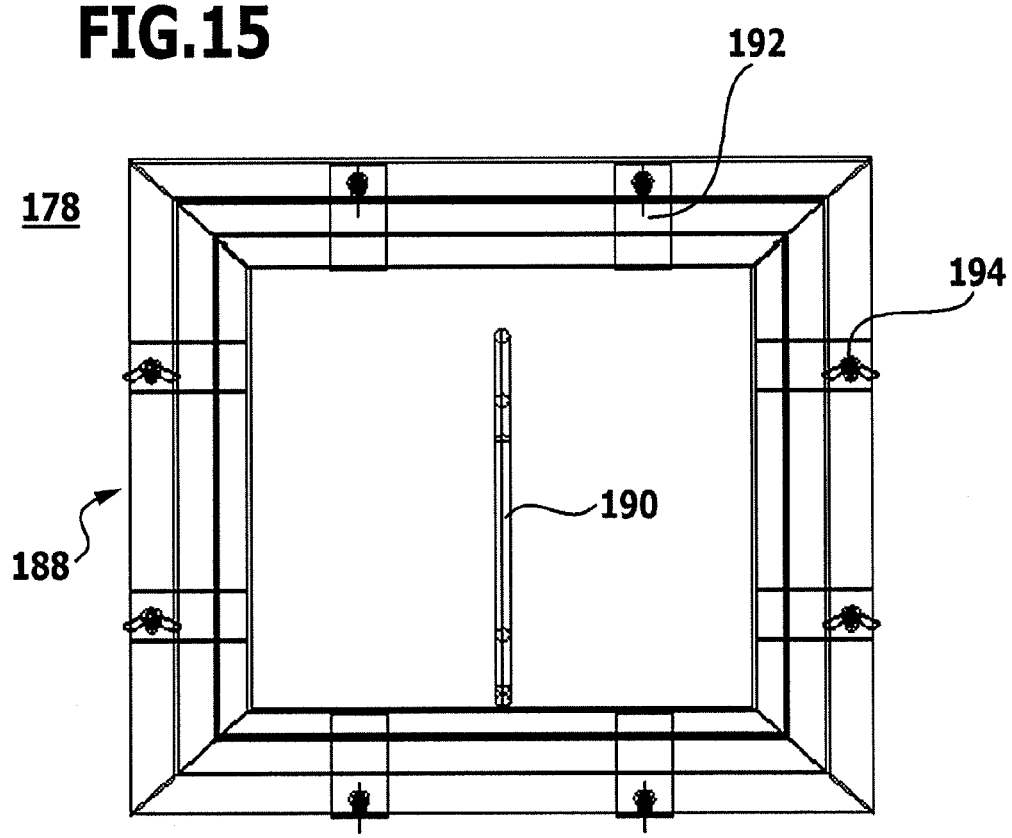
FIG. 15 a diagrammatic plan view of the outside of the inspection door of FIG. 14.

To allow access to the interior 186 of the auxiliary-material receiving container 176 for maintenance purposes, one of the side walls 178 is provided with an inspection opening that is closed during operation of the filter module 132 by an inspection door 188 having a handle 190 (see FIGS. 13 to 15).

As may be seen from FIG. 15, the inspection door 188 is mounted detachably by means of clamps 192 with wing nuts 194 on the associated side wall 178 of the auxiliary-material receiving container 176.

Mounted on the inspection door 188 is a compressed-air pipeline 196 that leads to a swirling device 198 (FIG. 14).

The swirling device 198 is used to deliver compressed air pulses into the auxiliary material situated underneath in order to swirl up this auxiliary material and introduce it into the crude gas stream being conveyed through the auxiliary-material receiving container 176.

By virtue of the swirling of the auxiliary material by means of the swirling device 198 a homogenization of the mixture of auxiliary material and overspray bonded thereto that is situated in the auxiliary-material receiving container 176 is moreover achieved.

During operation of the installation 100 the swirling device 198 is set in operation intermittently, for example four times per minute for in each case ca. 5 seconds.

The swirling device 198 comprises a plurality of, for example two, outlet nozzles 200 for compressed air, which take the form of cone nozzles and may each produce a compressed air cone that widens down in the direction of the base 182 of the auxiliary-material receiving container 176.

Preferably, the outlet nozzles 200 are designed and disposed in such a way that the compressed air cones produced by the cone nozzles 200 jointly sweep all of the base area of the auxiliary-material receiving container 176.

There is further disposed on the compressed-air pipeline 196 a mounting 202 for a level sensor 204, which comprises a rod-shaped sensor element 206 and a sensor housing 208, in which electronic sensor equipment is accommodated (FIG. 14).

The level sensor 204 takes the form of an analogue, in particular capacitive, sensor and is used to generate a signal corresponding in each case to a value consisting of a multiplicity of discrete level heights or a continuum of level heights in order to be able to determine the level of the auxiliary material in the auxiliary-material receiving container 176 as accurately as possible.

The rod-shaped sensor element 206 of the level sensor 204 is aligned substantially vertically and disposed as far as possible from the side walls 178 of the auxiliary-material receiving container 176 in the vicinity of the centre of the interior 186 of the auxiliary-material receiving container 176 in order that the measurement result of the level sensor 204 is impaired as little as possible by edge effects (FIG. 13).

The rod-shaped sensor element 206 of the level sensor 204 is oriented substantially at right angles to the horizontal base 182 of the auxiliary-material receiving container 176.

Figure 19:
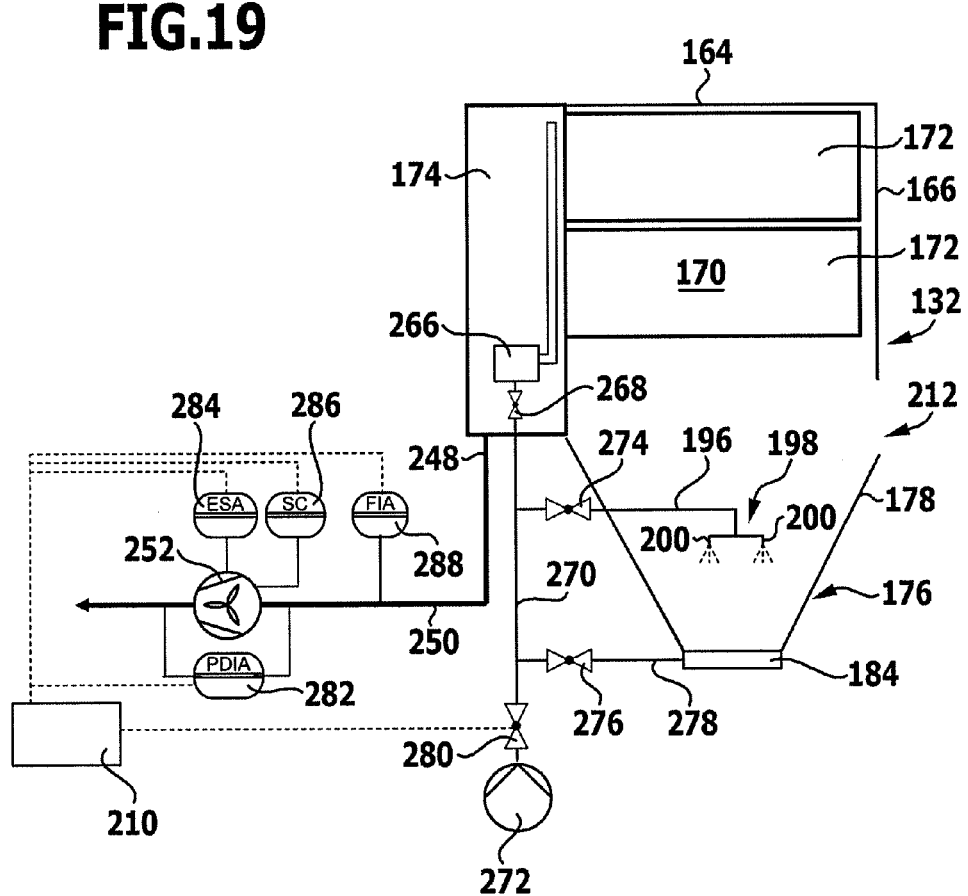
FIG. 19 a diagrammatic representation of a filter module and an outlet air line with blower disposed downstream of the filter module as well as various apparatuses for monitoring the operating state of the blower and an apparatus for supplying compressed air to the filter elements, to a swirling unit and to a fluid bed of the filter module.

The signal generated by the level sensor 204 is transmitted via a signal line (not shown) to an electric terminal box 209 of the filter module 132 that is disposed on the basic body 174 of the filter elements 172 (see FIG. 7) and from there to a control apparatus of the installation 100 that is diagrammatically illustrated in FIG. 19 and denoted by 210.

Figure 9:
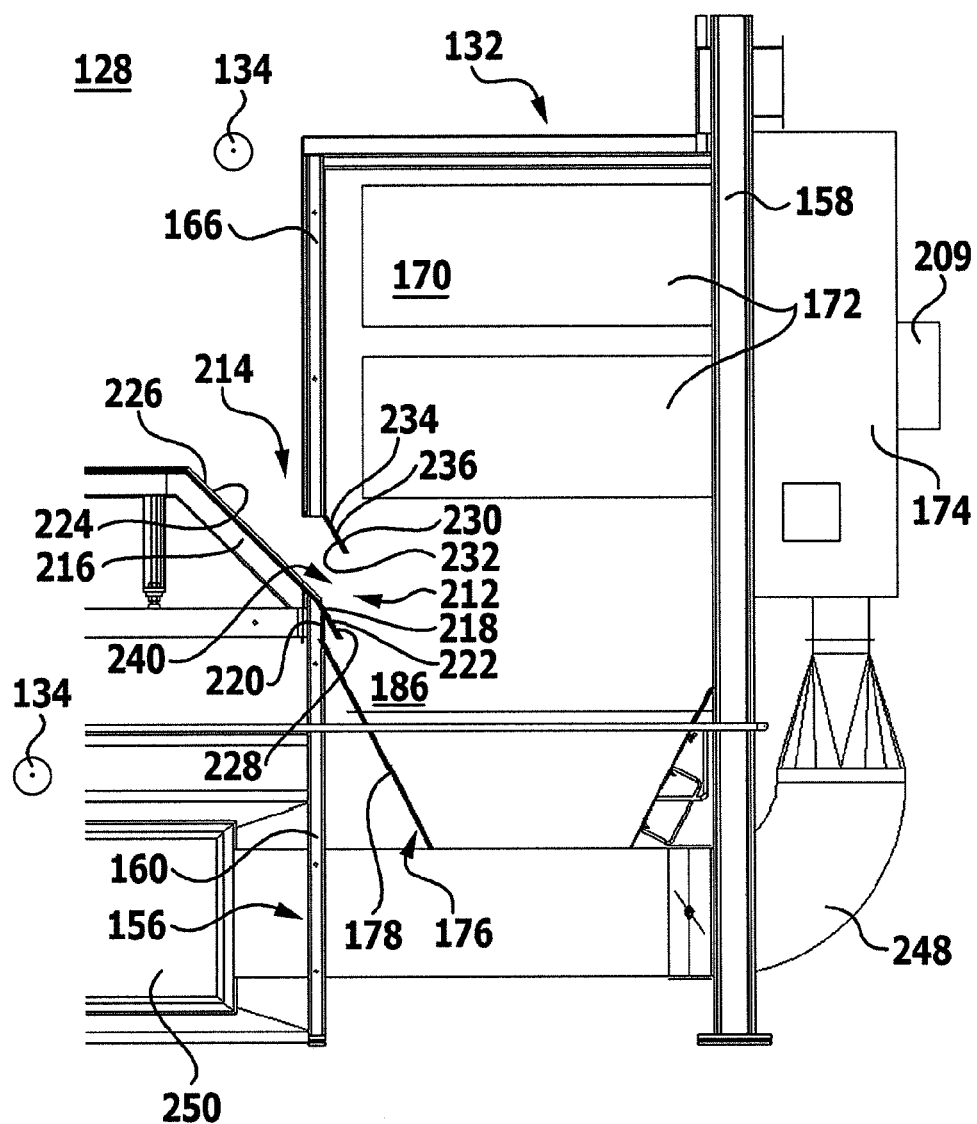
FIG. 9 a diagrammatic vertical cross section through a filter module.

In order to specifically direct the crude gas flow entering the filter module 132 into the interior 186 of the auxiliary-material receiving container 176 and prevent the crude gas flow from passing directly out of the flow chamber 128 in the direction of the filter elements 172, each filter module 132 is further provided with a slot-shaped inlet opening 212 that takes the form of an inlet channel 214, which for example, as may be seen in particular from FIG. 9, has a flow cross section that narrows in the flow direction of the crude gas stream up to a narrow point 240.

Alternatively or in addition thereto, it may also be provided that the inlet channel 214 has a flow cross section that widens from a narrow point 240 in the flow direction of the crude gas stream.

The inlet channel 214 is delimited in a downward direction by an intake slope 216, which extends from the front supports 160 of the support structure 156 obliquely upwards at an angle of inclination of for example ca. 40° to ca. 65° relative to the horizontal, and by a bottom baffle 218, which adjoins the bottom end of the intake slope 216 and is inclined to a great extent relative to the horizontal than the intake slope 216, for example at an angle of ca. 55° to ca. 70°, and which juts out from an upper, substantially vertically directed portion 220 of a side wall 178 of the auxiliary-material receiving container 176 and projects into the interior 186 of the auxiliary-material receiving container 176.

Thus, the bottom baffle 218 acts as a retention element 222 that keeps auxiliary material from the auxiliary-material receiving container 176 away from the inlet opening 212 and prevents swirled-up auxiliary material at the side of the inlet opening 212 from passing out of the auxiliary-material receiving container 176 along the side wall 178.

The bottom baffle 218 moreover prevents the crude gas flow from separating after passing through the intake slope 216 and guarantees a directed crude gas flow into the auxiliary-material receiving container 176.

The bottom baffle 218 has a depth (i.e. an extent in the flow direction of the crude gas stream) of for example ca. 100 mm.

The intake slope 216 and the bottom baffle 218 extend in the longitudinal direction 134 of the flow chamber 128 over substantially the entire length of the inlet opening 212 of for example ca. 1 m to ca. 2 m, which corresponds almost to the extent of the entire filter module 132 in the longitudinal direction 134.

The upper side of the intake slope 216 and the upper side of the bottom baffle 218 together form a bottom guide face 224 of the inlet opening 212 that delimits the inlet opening 212 in a downward direction and in its top portion 226, which is formed by the intake slope 216, has an inclination relative to the horizontal of ca. 40° to ca. 65° and in its bottom portion 228, which is formed by the bottom baffle 218, has a steeper inclination relative to the horizontal of ca. 55° to ca. 70°.

In an upward direction the inlet opening 212 is delimited by the bottom edge of the front wall 166 and by a top baffle 230, which projects from the bottom edge of the front wall 166 obliquely downwards into the interior of the filter module 132.

The top baffle 230, like the bottom baffle 218, is inclined an angle of for example ca. 55° to ca. 70° relative to the horizontal and extends in the longitudinal direction 134 over substantially the entire of the inlet opening 212 of for example 1 m or 2 m.

The top baffle 230 has a depth (i.e. an extent along the flow direction of the crude gas stream) of for example ca. 150 mm.

The bottom side of the top baffle 230 forms a top guide face 232, which delimits the inlet opening 212 in an upward direction and is inclined at an angle of for example ca. 55° to ca. 70° relative to the horizontal.

The effect achieved by this top baffle 230 for the crude gas stream is that the crude gas flow does not separate at the front wall 166 of the filter module 132 but is guided directly into the auxiliary-material receiving container 176.

The top baffle 230 further serves as a filter-shielding element 234 as it is designed and disposed at the inlet opening 212 in such a way that it prevents the crude gas entering the filter module 132 from flowing directly to the filter elements 172.

The top baffle 230 further serves as a deflection element 236, by means of which material that is cleaned off the filter elements 172 and contains auxiliary material and overspray particles bonded thereto is kept away from the inlet opening 212.

Rather, material that drops off the filter elements 172 onto the upper side of the top baffle 230 is guided by means of the inclination of the top baffle 230 into the auxiliary-material receiving container 176.

During operation of the filter module 132 both the top guide face 232 and the upper side of the top baffle 230 are provided with a coating of the auxiliary material, so that these areas of the top baffle 230 are easy to clean and no overspray adheres directly to the top baffle 230.

Figure 12:
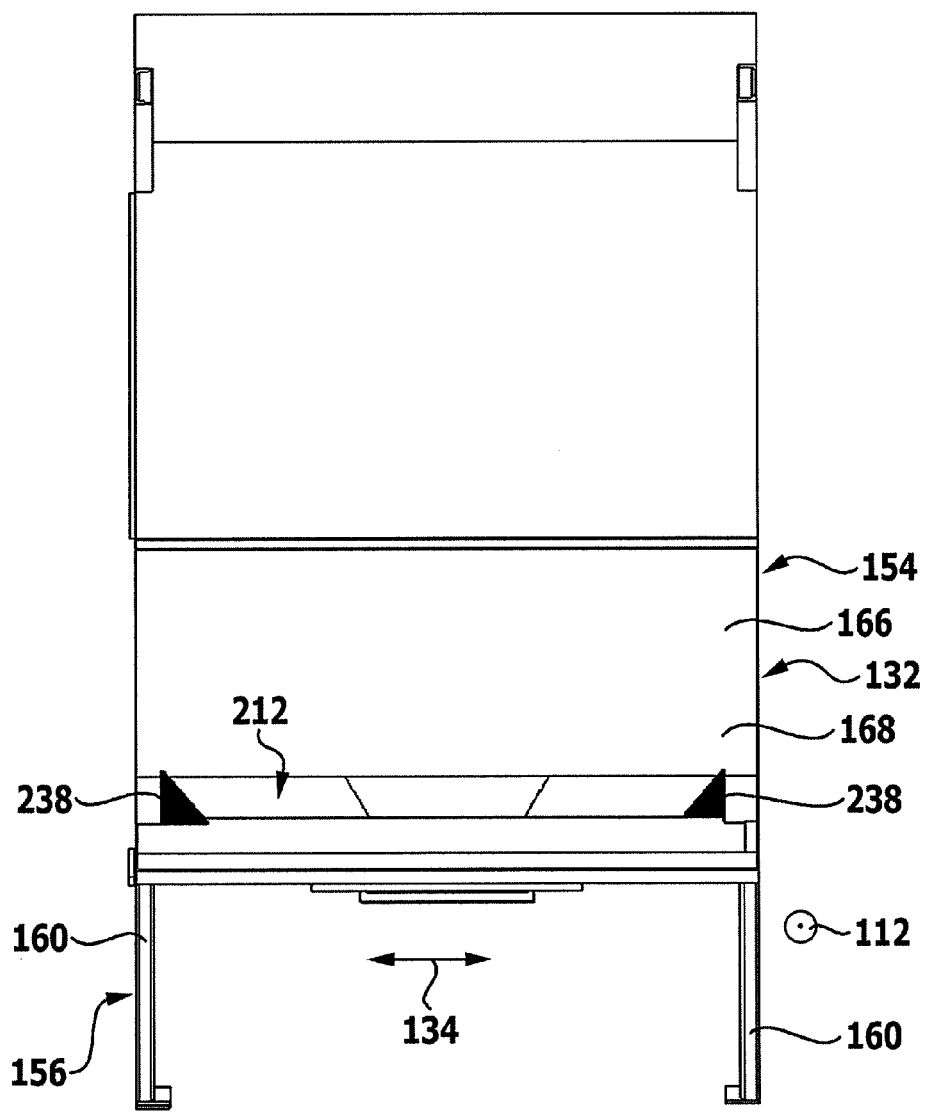
FIG. 12 a diagrammatic front view of a filter module.

As may best be seen from FIG. 12, the filter module 132 further comprises two cover elements 238 in the form of approximately triangular cover plates, which cover the left and the right bottom corner region of the inlet opening 212 in such a way that auxiliary material and overspray from the crude gas stream are kept away from these corner regions of the inlet opening 212 and deposits of auxiliary material and overspray particles are prevented in these corner regions and outside of the filter module 132 on the intake slope 216.

The upper sides of the cover elements 238 are oriented obliquely relative to the vertical and obliquely relative to the horizontal and each have a surface normal that is directed up into the exterior of the filter module 132.

The effect achieved by the previously described configuration of the geometry of the inlet opening 212 is that the inlet opening 212 has a narrow point 240, at which the flow cross section of the inlet opening 212 is at its smallest and hence the crude gas speed is at its highest.

Preferably, the crude gas speed at the narrow point is from ca. 2 m/s to ca. 8 m/s, in particular from ca. 3 m/s to ca. 5 m/s.

In this way the passing of auxiliary material from the interior of the filter module 132, which forms a closed box, into the flow chamber 128 and from there into the application region 108 is effectively prevented. The swirling of the auxiliary material in the auxiliary-material receiving container 176 and the cleaning of the filter elements 172 may therefore be effected at any desired time without having to interrupt the supply of crude gas to the filter module 132 or even the operation of the spray-painting devices 116 in the application region 108.

The fact that the crude gas stream as it leaves the inlet opening 212 is directed into the auxiliary-material receiving container 176 moreover guarantees that a deflection of the crude gas stream is effected in the interior 186 of the auxiliary-material receiving container 176. As a result, an adequate quantity of auxiliary material, which is produced from the supply situated in the auxiliary-material receiving container 176 by swirling, is entrained by the crude gas stream.

The crude gas flow from the flow chamber 128 through the inlet opening 212 into the interior of the filter module 132 is illustrated in FIG. 10 as the result of a flow simulation. From this it may clearly be seen that in the interior of the filter module 132 a rolling flow develops, the horizontally extending axis of which lies slightly deeper than the top edge of the auxiliary-material receiving container 176.

At the opposite side of the auxiliary-material receiving container 176 to the inlet opening 212 the crude gas flow charged with auxiliary material flows back out of the auxiliary-material receiving container 176 and is distributed over the entire depth of the filter-element receiving space 170, so that a turbulence develops around the filter elements 172 and, because of the high energy that the crude gas stream has received at the narrow point 240, a homogeneous distribution of the auxiliary material among the individual filter elements 172 is guaranteed.

As there are hardly any components of the filter module 132 situated in the flow path of the incoming crude gas stream, a fouling of components with sticky paint is extensively avoided and yet a flow against the filter elements 172 that is advantageous for filtration is obtained.

The fact that the mean flow direction of the crude gas stream passing through the narrow point 240 into the filter module 132 is inclined at an angle of more than 40° relative to the horizontal prevents the development in the bottom region of the filter-element receiving space 170 of an air lock, which would immediately convey material cleaned off the filter elements 172 back to the filter elements 172 and might lead to the formation of mutually opposed air vortices inside the filter module 132.

In order to be able to connect two filter modules 132, which are disposed alongside one another in a module row 136, to one another in a simple and stable manner or in order to be able to connect a filter module 132 to an adjoining transverse dividing wall 142, the support structure 156 of each filter module 132 comprises at least one rear support 158 that has a substantially flat contact face 242, which is oriented vertically and in the transverse direction 112 and may be placed against a corresponding contact face 242 of an adjacent filter module 132 or against an adjacent transverse dividing wall 142 (FIG. 7).

In the contact surface 242 through-openings 244 are further provided for the passage of fastening means, by means of which the rear support 158 serving as a connecting element 246 is connectable to a connecting element 246 of an adjacent filter module 132 or to an adjacent transverse dividing wall 142.

The rear support 158 serving as a connecting element 246 preferably has an approximately U-shaped profile.

As may be seen from FIG. 7, each middle module 140 has two rear supports 158 with U-shaped profiles, which serve as connecting elements 246 and of which the open sides face one another so that the middle module 140 is connectable at both sides to an adjoining further filter module 132 or to a transverse dividing wall 142.

Figure 8:
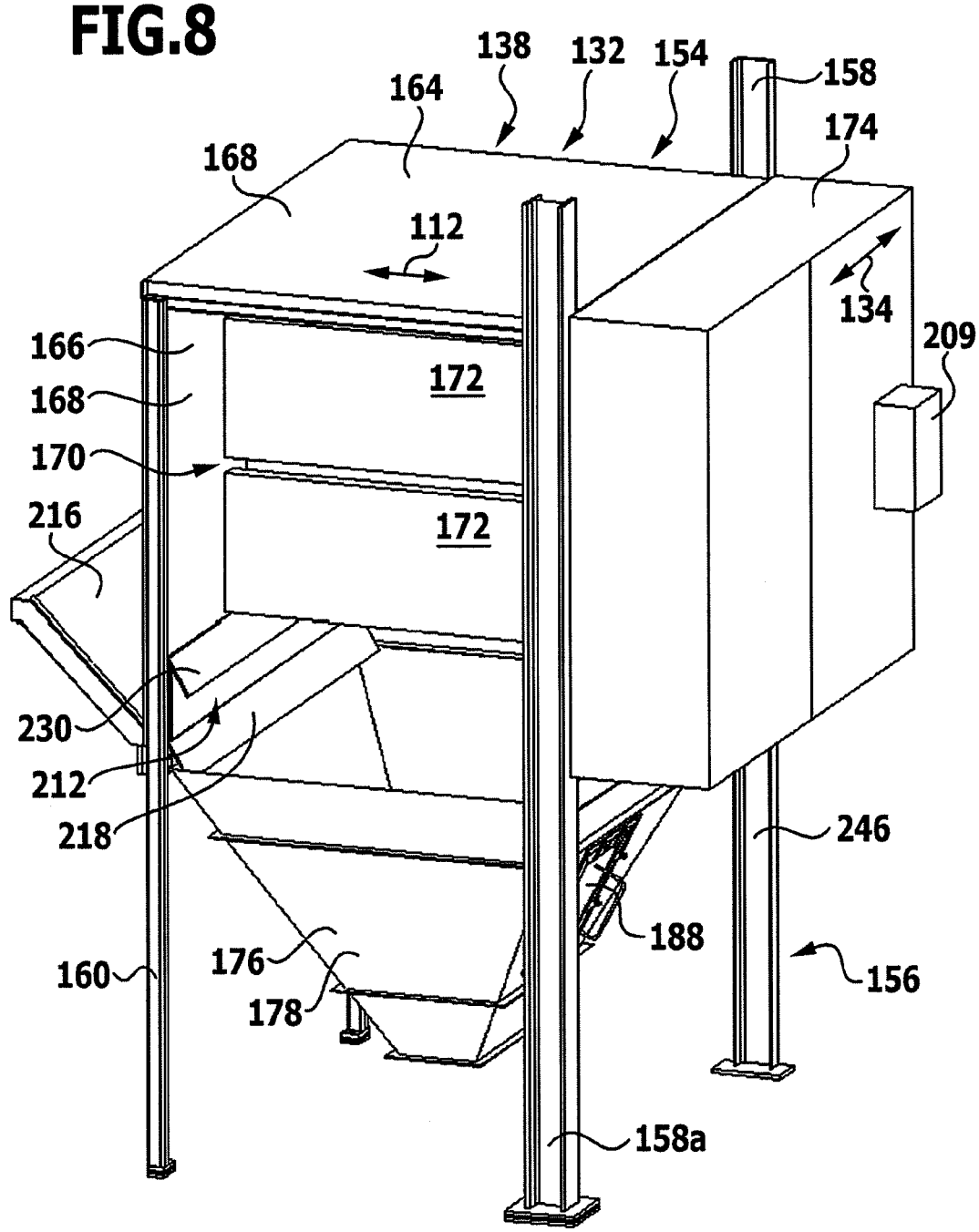
FIG. 8 a diagrammatic perspective representation of an individual filter module (corner module), which is provided for arrangement alongside a further filter module and at the opposite side forms one end of a filter module row.

As may be seen from FIG. 8, each corner module 138 has only one rear support 158 with a U-shaped profile configured as a connecting element 246; the opposite rear support 158a, which does not have to be connected either to an adjacent filter module 132 or to an adjacent transverse dividing wall 142, may have for example a T-shaped profile instead of a U-shaped profile in order to increase its mechanical strength.

Otherwise the corner modules 138 are constructionally and functionally identical to the middle modules 140 described in detail above.

During the operation of each filter module 132 the crude gas stream 120 sweeps over the filter surfaces of the filter elements 172, wherein both the entrained auxiliary material and the entrained wet-spray overspray are separated at the filter surfaces, and the filtered crude gas passes as an outlet air stream through the porous filter surfaces into the interiors of the filter elements 172, which are connected to a cavity inside the basic body 174, from which the filter elements 172 project. From this cavity the cleaned outlet air stream passes into in each case one outlet air pipe 248, which leads from the basic body 174 of the filter elements 172 of each filter module 132 to an outlet air channel 250, which is disposed approximately centrally under the flow chamber 128 and extends parallel to the longitudinal direction 134 of the flow chamber 128 (see in particular FIGS. 2 and 3).

As may be seen from the diagrammatic representation of FIG. 19, the outlet air, from which the wet-paint overspray has been removed, passes from the outlet air channel 250 to an outlet air blower 252, from where the cleaned outlet air is fed through a cooling stack (not shown) and a feed line (not shown) to an air chamber (not shown), the so-called plenum, that is disposed above the application region 108.

From this air chamber the cleaned outlet air passes through a filter cover back into the application region 108.

Branching off from the feed line is an outlet air line (not shown), by means of which a fraction of the cleaned outlet air stream is discharged (for example through a chimney) into the environment.

This fraction of the outlet air stream that is discharged into the environment is replaced by fresh air that is fed into the flow chamber 128 by means of two air curtain generating apparatuses 254, which are connected by in each case one inlet air line 256 to an inlet air installation (not shown) (FIGS. 1 to 3).

Each of the air curtain generating apparatuses 254 comprises an inlet air chamber, which extends in the longitudinal direction 134 of the flow chamber 128, is supplied with inlet air through the inlet air line 256 and opens out by means of a gap 258, which extends along the longitudinal direction 134 and in vertical direction has an extent in the region of for example ca. 15 cm to ca. 50 cm, into an upper portion 260 of the flow chamber 128 that is delimited in an upward direction by the application region 108 and in a downward direction by the top walls 164 of the filter modules 132.

The gap 258 of each inlet air chamber is disposed just above the top walls 164 of the filter modules 132, so that the flow of inlet air from the inlet air chambers in substantially horizontal direction along the upper sides of the top walls 164 of the filter modules 132 into the flow chamber 128 leads at the upper side of each of the filter modules 132 to the formation of an air curtain, which extends from the respective associated air curtain generating apparatus 254 to a narrow point 262 between the upper edges of the mutually opposite module rows 136 and therefore prevents the crude gas stream charged with the wet-paint overspray from passing from the application region 108 to the upper side of the filter modules 132 and prevents the wet-paint overspray from the crude gas stream 120 depositing on the upper side of the filter modules 132.

At the narrow point 262 of the flow chamber 128 the horizontal cross section of the flow chamber 128, through which the crude gas stream may flow, suddenly decreases so that the flow speed of the crude gas stream is markedly higher in the bottom portion 262 of the flow chamber 128 situated underneath the narrow point 262 than in the top portion 260 of the flow chamber 128 situated above the narrow point 262.

The mean flow direction of the air in the transverse air curtains generated by the air curtain generating apparatuses 254 at the upper side of the filter modules 132 is illustrated in FIG. 3 by the arrows 264.

Most of the air conveyed through the application region 108 is therefore conveyed in a recirculation air circuit, which comprises the application region 108, the flow chamber 128, the filter modules 132, the outlet air pipes 248, the outlet air channel 250, the outlet air blower 252 as well as the supply line and the air chamber above the application region 108, wherein a constant heating of the air conveyed in the recirculation air circuit is prevented by the fresh air supply through the air curtain generating apparatuses 254.

As the separation of the wet-paint overspray from the crude gas stream 120 by means of the filter elements 172 is a dry process, i.e. without washing-out with a cleaning liquid, the air conveyed in the recirculation air circuit is not humidified during separation of the wet-paint overspray, with the added result that no apparatuses for dehumidifying the air conveyed in the recirculation air circuit are required at all.

Nor is there any need for apparatuses for separating wet-paint overspray from a washing-out cleaning liquid.

By virtue of the fact that the horizontal cross section of the flow chamber 128, through which the crude gas stream may flow, is markedly lower as a result of the provision of the filter modules 132 in the bottom portion 263 of the flow chamber 128 situated below the narrow point 262 than in the top portion 260 of the flow chamber 128 (for example in the bottom portion 263 is only ca. 35% to ca. 50% of the horizontal cross-sectional area of the flow chamber 128 in the top portion 260 thereof), the flow speed of the crude gas stream along its route from the application region 108 through the flow chamber 128 to the inlet openings 212 of the filter modules 132 is continuously increased, thereby resulting in a rising speed profile in the crude gas stream.

As a result of this rising speed profile, particles leaving the filter modules 132 are unable to pass into the application region 108.

In this case, the speed of the crude gas flow in the application region 108 and in the top portion 260 of the flow chamber 128 is for example up to ca. 0.6 m/s, whereas in the bottom region 263 of the flow chamber it lies for example in the region of ca. 0.6 m/s to ca. 3 m/s and in the inlet openings 212 of the filter modules 132 rises to a maximum value in the region of ca. 3 m/s to ca. 5 m/s.

By virtue of the fact that the filter elements 172 are housed completely in the filter modules 132, an activation of the filter elements 172 by applying auxiliary material and a cleaning of the filter elements 172 is possible at any time while the painting process is running in the application region 108.

If the width of the spray booth 110, i.e. its extent in the transverse direction 112, is varied, filter modules 132 of the same size are still used; the adaptation of the apparatus 126 for separating wet-paint overspray is effected in this case merely by increasing the distance between the two module rows 136 and by widening the walkway 146.

Given such a widening of the paint booth 110, the speed profile of the crude gas flow therefore changes only in the region up to the walkway 146; from here, i.e. in particular during passage through the inlet openings 212 of the filter modules 132, the speed profile of the crude gas flow is dependent only upon the crude gas quantity flowing through per unit of time, not however upon the geometry of the flow chamber 128.

For maintenance reasons, the spacing of the (walk-on) top walls 164 of the filter modules 132 from the bottom edge of the vehicle bodies 102 conveyed through the spray booth 110 is at least ca. 1.5 m.

The filter elements 172 are cleaned by compressed air pulses at specific time intervals when their charging with wet-paint overspray and auxiliary material has reached a predetermined extent.

This cleaning may be effected (in dependence upon the rise in pressure loss at the filter elements 172) for example 1 to 6 times per 8-hour working shift, i.e. approximately every 1 to 8 hours.

The required compressed air pulses are generated by means of a pulse output unit 266 that is disposed on the basic body 174 of the filter elements 172 of each filter module 132, wherein the pulse output unit 266 is capable of delivering compressed air pulses to compressed air pipes, which extend inside the respective basic body 174 and lead from the pulse output unit 266 into the interiors of the filter elements 172 (FIG. 19).

From the interiors of the filter elements 172 the compressed air pulses pass through the porous filter surfaces into the filter-element receiving space 170, wherein the barrier layer formed on the filter surfaces and comprising auxiliary material and the wet-paint overspray deposited thereon is detached from the filter surfaces, thereby restoring the filter surfaces to their original clean state.

The pulse output unit 266 comprises a pulse output valve 268, through which the pulse output unit 266 may be supplied with compressed air from a compressed-air supply line 270, which is supplied by a compressor 272 (see FIG. 19).

The compressed air pipeline 196 that leads to the outlet nozzles 200 of the swirling device 198 is also connected by a compressed air valve 274 to this compressed-air supply line 270.

The fluid bed 184 of each auxiliary-material receiving container 176 is moreover also connected to the compressed-air supply line 270 by a compressed air line 278 that is provided with a compressed air valve 276.

Opening of the pulse output valve 268, the compressed air valve 274 and the compressed air valve 276 may therefore lead, alternately or simultaneously, to a cleaning of the filter elements 172, a swirling of the auxiliary material in the auxiliary-material receiving container 176 and/or a fluidization of the auxiliary material in the auxiliary-material receiving container 176 by means of the fluid bed 184.

Disposed between the described compressed air valves and the compressor 272 in the compressed-air supply line 270 there is a stop valve 280, which is controllable by means of the control apparatus 210 in the local control station.

The control apparatus 210 by closing the stop valve 280 blocks the compressed air supply from the compressor 272 to the described compressed air units of a filter module 132 or of all of the filter modules 132 if it determines that there is not an adequate crude gas flow through the filter elements 172.

In order to detect whether there is an adequate crude gas flow through the filter elements 172 it may for example be provided that the control apparatus 210 monitors the operating state of the outlet air blower 252.

This monitoring of the operating state of the outlet air blower 252 may be effected for example by means of a differential pressure gauge (PDIA) 282, which measures the pressure drop between the discharge end and the suction side of the outlet air blower 252.

Alternatively or in addition thereto, the operating state of the outlet air blower 252 may be monitored by the control apparatus 210 also by means of a current monitoring appliance (ESA) 284 and/or by means of a frequency converter (SC) 286.

It may further be provided that the absence of an adequate crude gas flow through the filter elements 172 is detected by means of a flow meter (FIA) 288, which measures the gas flow through the outlet air channel 250 or through one or more of the outlet air pipes 248.

There is further the possibility of detecting the absence of an adequate crude gas flow through the filter elements 172 by measuring the pressure drop at the filter elements 172 of a filter module 132 or of all of the filter modules 132.

If the control apparatus 210, on the basis of the signals transmitted to it by the differential pressure gauge 282, the current monitoring appliance 284, the frequency converter 286 and/or the flow meter 284, determines that the crude gas flow through the filter elements 172 is below a predetermined threshold value, the compressed air supply to at least one of the filter modules 132 is blocked by closing the stop valve 280.

Auxiliary material is thereby prevented from passing, as a result of swirling by means of the swirling unit 198, cleaning of the filter elements 172 or fluidization of the auxiliary material supply in the auxiliary-material receiving container 176, into the flow path of the crude gas and in particular through the inlet opening 212 of a filter module 132 into the flow chamber 128 and, from there, into the application region 108.

This blocking of the compressed air supply may be effected for all of the filter modules 132 jointly or for the individual filter modules 132 separately from one another. In the latter case, the detection of the absence of an adequate crude gas flow through the filter elements 172 is effected separately for each of the filter modules 132, and either each filter module 132 is provided with its own compressor 272 or the compressed-air supply lines 270 to the individual filter modules 132 may be blocked or released individually by means of stop valves 280 that are operable separately from one another.

In the case of the previously described apparatus 126 for separating wet-paint overspray, the auxiliary material is added to the crude gas stream exclusively inside the filter modules 132 by swirling the auxiliary material in the respective auxiliary-material receiving container 176.

Figure 17:
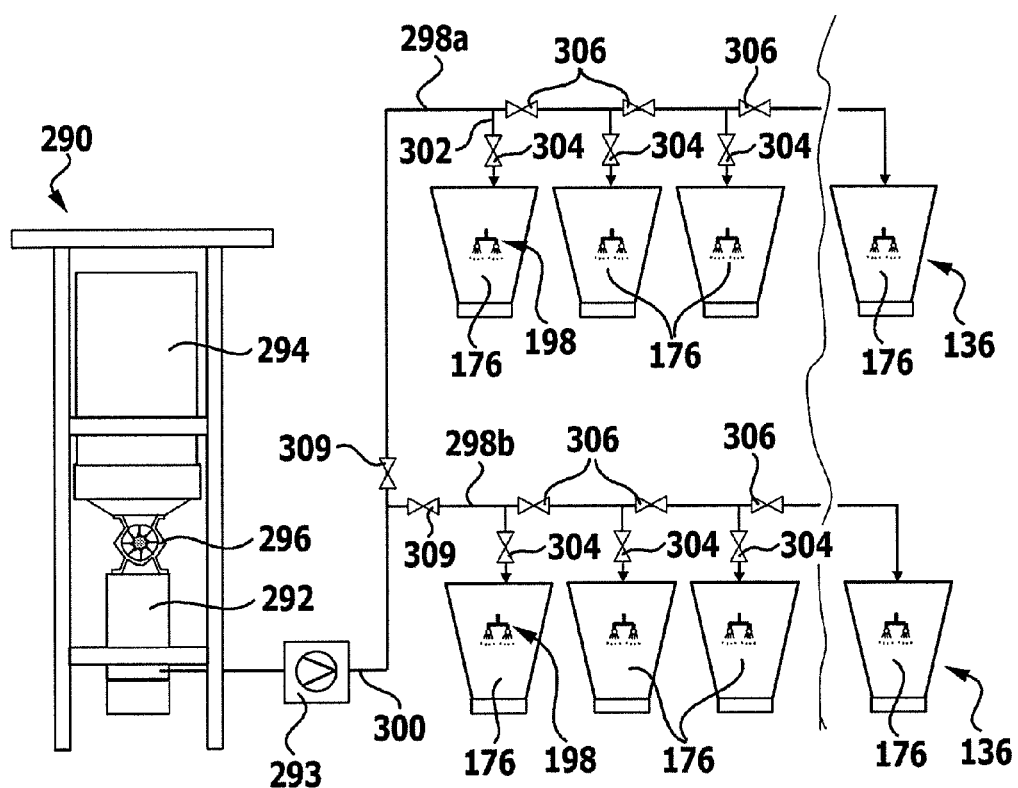
FIG. 17 a diagrammatic representation of an apparatus for supplying fresh auxiliary material from a dispensing container to auxiliary-material receiving containers of the type illustrated in FIG. 13, which are situated in their working position.

In order to be able to supply fresh auxiliary material to the auxiliary-material receiving containers 176, which are permanently mounted in their working position inside the filter modules 132, the apparatus 126 for separating wet-paint overspray comprises an auxiliary-material supply apparatus 290, which is diagrammatically illustrated in FIG. 17 and comprises a dispensing container 292 that may take the form of a blowpot or a simple fluidization container.

Blowpots are known as such for example from JP 02123025 A or JP 06278868 A and have previously been used in coating installations to feed coating powder to the application containers situated in the vicinity of the sputtering units. They are relatively small sealable containers having an air-permeable base, through which air is directed for fluidizing the powder and feeding it into the container.

Whilst a blowpot may be emptied by the pressure of the fluidization air, there is otherwise disposed downstream of the fluidization container a powder dosing pump 293 for the feeding of material (see FIG. 1), such as for example the so-called DDF pump described in WO 03/024612 A1 or a different dosing pump that delivers with alternating suction and force according to the dense flow principle, such as are known for example from EP 1 427 536 B1, WO 2004/087331 A1 or from FIG. 3 of DE 101 30 173 A1.

For filling the dispensing container 292 there is disposed above it a larger storage container (packing drum or "big bag") 294 for the fresh auxiliary material, from which in the simplest case the material may trickle into the dispensing container (silo) 292 through an opening that is closable by means of a flap. However, in order to enable continuous replenishing of the dispensing container 292 even during the feeding of material and prevent losses of time during operation, a mechanical conveying device 296, for example a cellular wheel sluice or a conveyor worm, is preferably disposed between the storage container 294 and the dispensing container 292. Given the use of such a conveying device, it is advantageously possible also to adjust a desired filling quantity, in the case of a cellular wheel sluice by means of the previously determined filling quantity per cell.

The dispensing container 292 is connected to each of the auxiliary-material receiving containers 176 by a main line 300, which splits into two branches 298a, 298b and from which stub lines 302 lead to in each case one of the auxiliary-material receiving containers 176. In this case, each of the branches 298a, 298b of the main line 300 leads in each case to the auxiliary-material receiving containers 176 of a module row 136.

The main line 300 is made preferably of flexible tubes.

For this purpose, tubes having an inside diameter of up to ca. 14 mm, in particular from ca. 6 mm to ca. 12 mm, may be used.

The stub lines 302 may be tubular and are provided in each case with a mechanical pinch valve 304, wherein in each case a second pinch valve 306 is disposed in the flow direction of the auxiliary material downstream of the branching of the respective stub line 302.

Further pinch valves 309 are disposed at the branching of the two branches 298a, 298b of the main line 300 in order to be able, according to requirements, to open or close these two branches 298a, 298b.

During operation of the auxiliary-material supply apparatus 290 the main line 300 and all of the stub lines 302 are initially empty. If a specific auxiliary-material receiving container 176 is to be charged with fresh auxiliary material, the main line is blocked downstream of the branching point of the associated stub line 302 by closing the respective associated pinch valve 306, the relevant stub line 302 is opened by opening the associated pinch valve 304, and then the auxiliary material is fed from the dispensing container 292 into the relevant auxiliary-material receiving container 176.

The previously described line path into the relevant auxiliary-material receiving container 176 is then emptied and flushed. This offers the advantage that the coating quantity is always accurately determined and dosable and that the line path cannot become blocked as a flushing operation into the charged auxiliary-material receiving container 176 is always effected.

Each of the stub lines 302 opens out into one of the side walls 178 of the respective associated auxiliary-material receiving container 176, preferably in a region close to the upper edge of the auxiliary-material receiving container 176, so that as large a quantity of auxiliary material as possible may be supplied through the stub line 302.

The stub line 302 leading to the in each case last auxiliary-material receiving container 176 of a module row 136 does not need a pinch valve arrangement as, for charging this last auxiliary-material receiving container 176, all that is required is to open all of the pinch valves 306 and 309 disposed in the main line 300 upstream of this auxiliary-material receiving container 176.

Instead of the previously described pinch valve arrangements, mechanical pinch-type distributing guides, which are known as such from the background art, or other forms of powder distributing guides may be provided at the branching points of the auxiliary-material line system.

Figure 18:
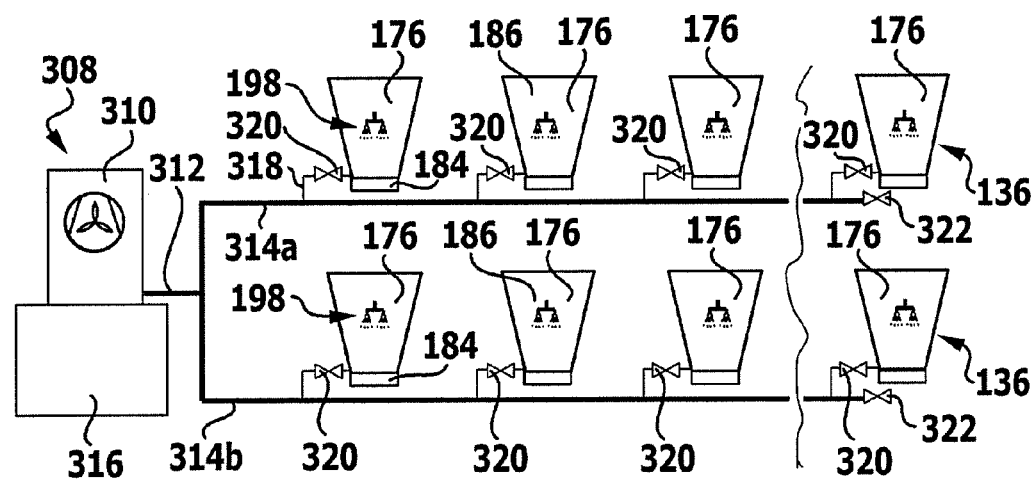
FIG. 18 a diagrammatic representation of a removal apparatus for removing auxiliary material mixed with overspray from the auxiliary-material receiving containers to a collecting container.

In order that, prior to the supply of fresh auxiliary material to an auxiliary-material receiving container 176, the auxiliary material mixed with overspray that has collected therein may be removed and fed for disposal or recycling, the apparatus 126 for separating wet-paint overspray further comprises an auxiliary-material removal apparatus 308, which is diagrammatically illustrated in FIG. 18.

The auxiliary-material removal apparatus 308 in turn comprises a suction fan 310, for example a dust suction fan, which feeds spent auxiliary material out of a main line 312, which splits into two branches 314a, 314b, into a collecting container 316 disposed under the suction fan 310.

In each case, one of the branches 314a, 314b of the main line 312 leads to the auxiliary-material receiving containers 176 of a module row 136 and is connected by in each case one stub line 318, which is closable by means of a pinch valve 320, to each of the auxiliary-material receiving containers 176 of the relevant module row 136.

Disposed at the end of each branch 314a, 314b of the main line 312 is a ball valve 322, through which, where necessary, feed air may be supplied into the main line 312 in order to facilitate the extraction of the auxiliary material from the main line 312 to the suction fan 310.

The stub lines 318 open out in each case just above the fluid bed 184 into the interior 186 of the respective auxiliary-material receiving container 176, preferably in a corner region of the auxiliary-material receiving container 176 where two side walls 178 meet.

For an extraction of the spent auxiliary material that is efficient and as complete as possible, it is particularly advantageous if the stub line 318 splits into two extraction lines, each of which opens out at a different corner region into the interior 186 of the auxiliary-material receiving container 176.

If spent auxiliary material mixed with overspray is to be emptied from a specific auxiliary-material receiving container 176, then for this purpose the pinch valve 320 of the respective associated stub line 318 is opened and by means of the suction fan 310 the material situated in the auxiliary-material receiving container 176 is sucked through the stub line 318 and the main line 312 and fed into the collecting container 316.

The extraction operation is terminated by closing the respective associated pinch valve 320.

During the extraction operation the fluid bed 184 of the relevant auxiliary-material receiving container 176 is set in continuous operation, i.e. is swept with compressed air throughout the extraction operation in order to fluidize the material to be extracted and make it highly flowable.

The extraction of the spent auxiliary material from the auxiliary-material receiving container 176 may moreover be assisted by setting the swirling device 198 of the relevant auxiliary-material receiving container 176 into continuous or intermittent operation (for example for 6×5 seconds per minute) during the extraction operation, because by virtue of the material to be extracted being acted upon from above by compressed air through the outlet nozzles 200 of the swirling device 198 the material is loosened up and moved in the direction of the mouth openings of the stub line 318.

If the extraction of the spent auxiliary material from one of the auxiliary-material receiving containers 176 is not working properly, which may be detected by the associated level sensor 204 indicating a level that is no longer falling, operation of the apparatus 126 for separating wet-paint overspray need not be interrupted. Rather, auxiliary material may instead be extracted from another auxiliary-material receiving container 176 that is connected to the same branch 314a or 314b of the main line 312. By so doing, in many cases the blocking of the material feed from the blocked auxiliary-material receiving container 176 may be lifted, with the result that the material from the previously blocked auxiliary-material receiving container 176 may then be extracted.

The material that is extracted from the auxiliary-material receiving container 176 and contains auxiliary material together with overspray particles may be either disposed of or—optionally after processing—at least partially recycled in the coating installation.

It may further be provided that the substances of the auxiliary material are so selected that, after use in the coating installation, they may be utilized for purposes other than for the coating of workpieces. For example, the spent auxiliary material may be used as insulating material or be used thermally, for example in the brick- or cement industry or the like, wherein the wet-paint overspray bonded to the auxiliary material may equally be used as a source of energy in a combustion process necessary for production.

After extraction of the spent auxiliary material from an auxiliary-material receiving container 176, the latter is charged with fresh auxiliary material by means of the auxiliary-material supply apparatus 290 already described above, namely for example up to an initial charging level of ca. 50% of the total capacity of the auxiliary-material receiving container 176.

By virtue of the enrichment of wet-paint overspray, which has a lower density than the auxiliary material, in the mixture of auxiliary material and overspray that is situated in the auxiliary-material receiving container 176, the density of this mixture continuously decreases during the operation of a filter module 132, with the result that the barrier layer that builds up on the filter elements 172 of the filter module 132 has a progressively greater volume.

The level of the material in the auxiliary-material receiving container 176 immediately before a cleaning operation of the filter elements 172 therefore progressively falls.

Given a predetermined residual level, which corresponds for example to ca. 10% of the capacity of the auxiliary-material receiving container 176, the auxiliary material mixed with overspray is extracted from the auxiliary-material receiving container 176 in the manner described above. The effect achieved by extraction prior to a cleaning operation of the filter elements 172 is that it is mainly the material, which has become unusable and has collected in the auxiliary-material receiving container 176 and does not form the barrier layer on the filter elements 172, that is removed from the auxiliary-material receiving container 176.

As an alternative to this procedure it may also be provided that the level of the material in the auxiliary-material receiving container 176 is measured in each case after a cleaning operation of the filter elements 172 of a filter module 132 and an extraction operation is initiated if a predetermined maximum level, for example 90% of the maximum capacity of the auxiliary-material receiving container 176, is reached.

In any case, the level of the material in the auxiliary-material receiving container 176 that triggers an extraction operation is determined by means of the level sensor 204 that is disposed in the respective auxiliary-material receiving container 176.

Figure 20:
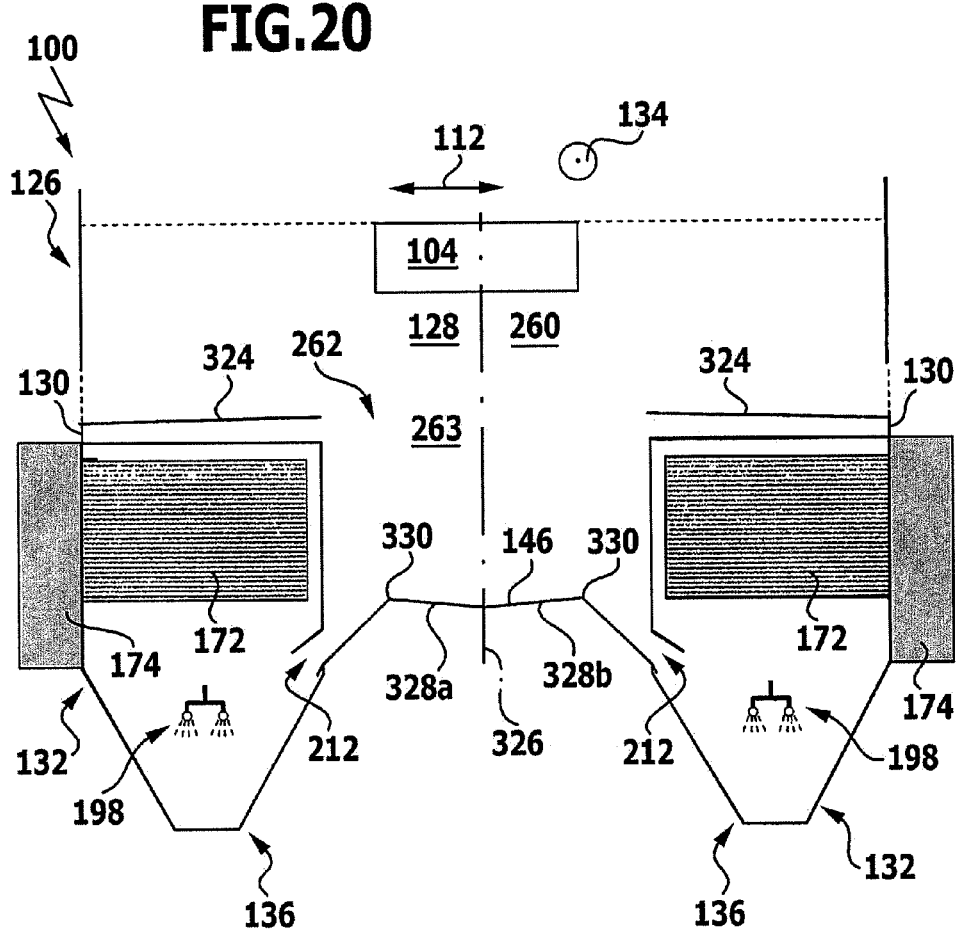
FIG. 20 a diagrammatic vertical section through a second embodiment of an apparatus for separating wet-paint overspray from a crude gas stream containing overspray particles, which apparatus comprises inclined flow-directing baffles for directing a transverse air stream as well as a walkway with an inclined upper side between the filter modules.

A second embodiment of an installation 100 for painting vehicle bodies 102 that is illustrated in a diagrammatic cross section in FIG. 20 differs from the previously described first embodiment in that above the filter modules 132 separate transverse air curtain baffles 324 are disposed, which are used to direct the inlet air supplied by the air curtain generating apparatuses 254 towards the narrow point 262 between the top portion 260 and the bottom portion 263 of the flow chamber 128.

These transverse air curtain baffles 324 are inclined in the direction of the in each case adjacent side wall 130 of the flow chamber 128 at an angle of for example ca. 1° to ca. 3° relative to the horizontal, so that liquids passing from above onto the transverse air curtain baffles 324 flow off, not towards the narrow point 262, but towards the side walls 130.

This guarantees that for example paint escaping from the application region 108 because of a burst tube or water for fire fighting is unable to pass into the bottom portion 263 of the flow chamber 128 and from there into the filter modules 132 but may instead flow off at the sides of the flow chamber 128.

Moreover, in this embodiment the walkway 146 between the module rows 136 is divided into two halves 328a, 328b, which are designed substantially mirror-symmetrically relative to a vertical longitudinal centre line 326 of the flow chamber 128 and inclined in the direction of the longitudinal centre line 326 in each case at an angle of for example ca. 1° to for example ca. 3° relative to the horizontal, so that liquids, such as for example paint or water for fire fighting, dropping from above onto the walkway 146 do not pass over the side edges 330 of the walkway 146 to the inlet openings 212 of the filter modules 132 but are retained in the middle of the walkway 146.

Both the walkway 146 and the transverse air curtain baffles 324 may additionally be inclined in the longitudinal direction 134 of the flow chamber 128 relative to the horizontal, so that liquids situated on these elements may flow off under the effect of gravitational force to a discharge opening.

Otherwise the second embodiment of an installation 100 for painting vehicle bodies 102 that is illustrated in FIG. 20 is constructionally and functionally identical to the first embodiment illustrated in FIGS. 1 to 19, reference being made in this respect to the above description thereof.

Figure 21:
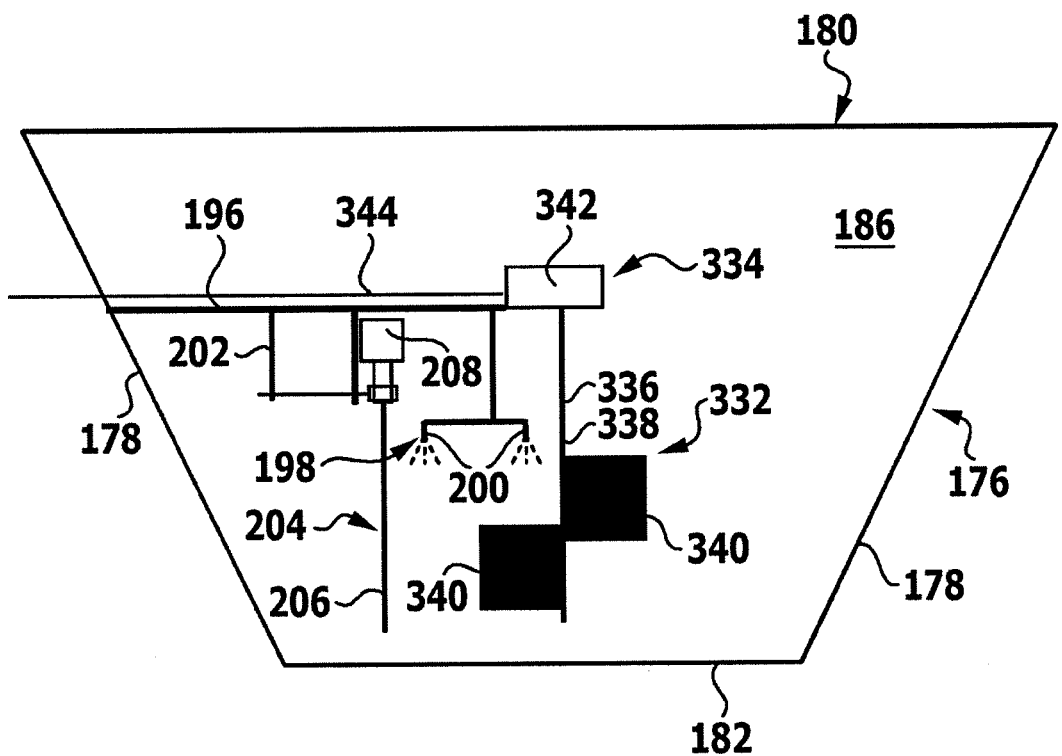
FIG. 21 a diagrammatic vertical cross section through an alternative embodiment of an auxiliary-material receiving container, which is provided with a pneumatically operated agitator for thoroughly mixing the material situated in the auxiliary-material receiving container and for homogenizing the receiver.
Figure 22:
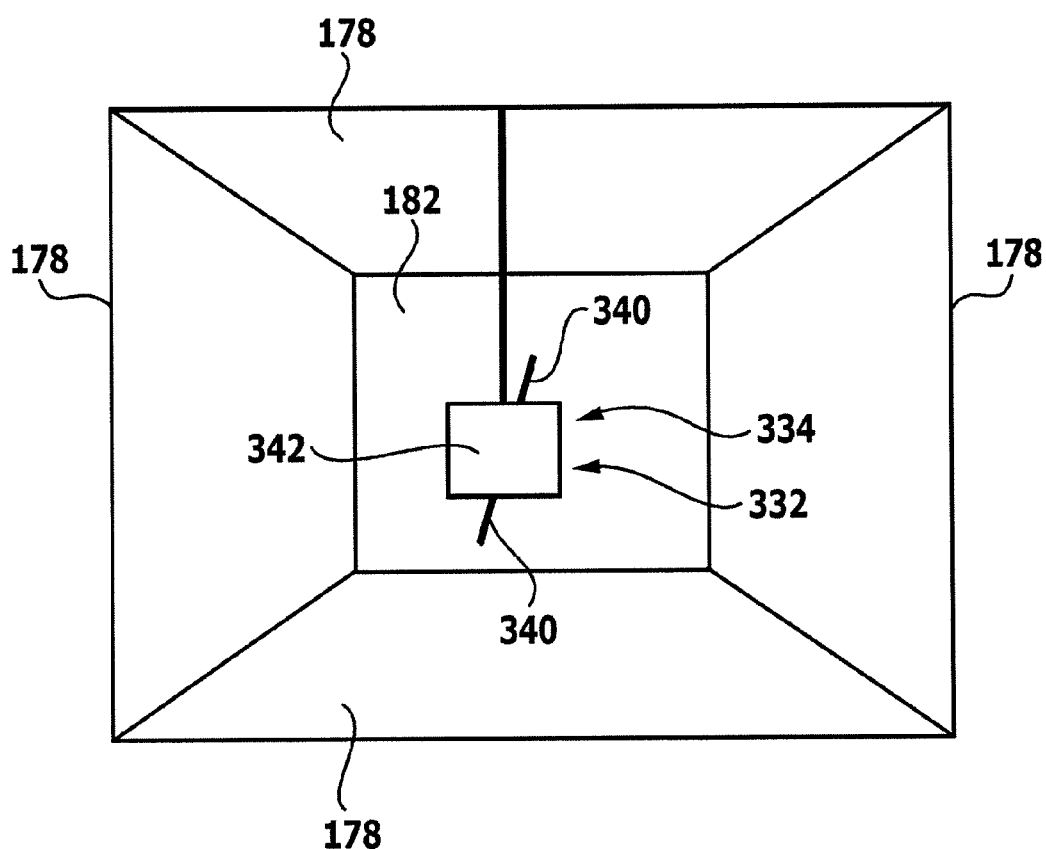
FIG. 22 a diagrammatic top view of the auxiliary-material receiving container with pneumatically operated agitator of FIG. 21.

The auxiliary-material receiving containers 176 of the filter modules 132 of the previously described installations 100 for painting vehicle bodies 102 may also comprise, as an alternative or in addition to the fluid bed 184 illustrated in FIG. 13, other devices 332 for thoroughly mixing the material situated in the auxiliary-material receiving container 176, for example a pneumatically operated agitator 334, which is diagrammatically illustrated in FIGS. 21 and 22.

The pneumatically operated agitator 334 comprises a stirrer 336 having at least two agitator paddles 340, which are disposed in a rotationally fixed manner on a substantially vertically aligned agitator shaft 338, as well as an agitator turbine 342, which is illustrated purely diagrammatically in FIGS. 21 and 22 and by means of which the agitator shaft 338 may be set in rotation about its vertical axis.

The agitator paddles 340 are arranged on the agitator shaft 338 so as to be mutually offset at an angular distance of for example ca. 180° and in the axial direction of the agitator shaft 340.

Compressed air may be supplied to the agitator turbine 342 through a compressed-air supply line 344.

When compressed air is supplied to the agitator turbine 342 through the compressed-air supply line 344, the supplied compressed air sets the agitator turbine 342 in rotation about the vertical axis thereof, with the result that the agitator shaft 338 connected in a rotationally fixed manner to the agitator turbine 342 is likewise set in motion.

In this case, the material situated in the auxiliary-material receiving container 176 is thoroughly mixed by the rotating agitator paddles 340, and the surface of the material situated in the auxiliary-material receiving container 176 is smoothed. Material bridges formed by undermining in the auxiliary-material receiving container 176 are broken up.

In this way, an efficient thorough mixing of the material in the auxiliary-material receiving container 176 and an evening-out of the level of the material inside the auxiliary-material receiving container 176 is achieved.

As a result of the pneumatic operation of the agitator 334 sparking is avoided inside the auxiliary-material receiving container 176 and an adequate protection against explosion is guaranteed.

Figure 23:
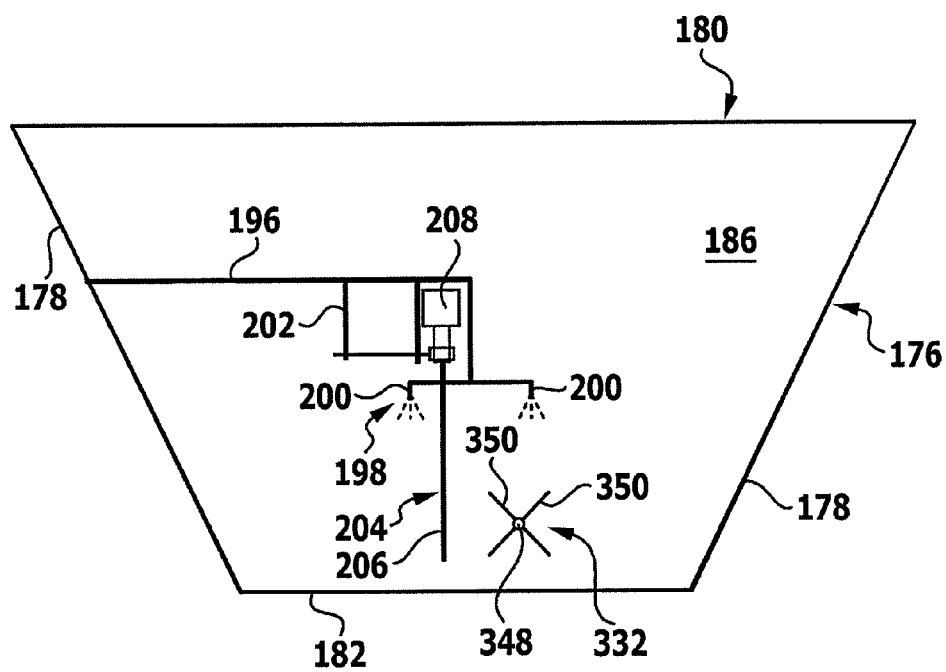
FIG. 23 a diagrammatic vertical section through a further alternative embodiment of an auxiliary-material receiving container, which is provided with an electrically driven shaft and paddles for thoroughly mixing the material situated in the auxiliary-material receiving container and for homogenizing the receiver.
Figure 24:
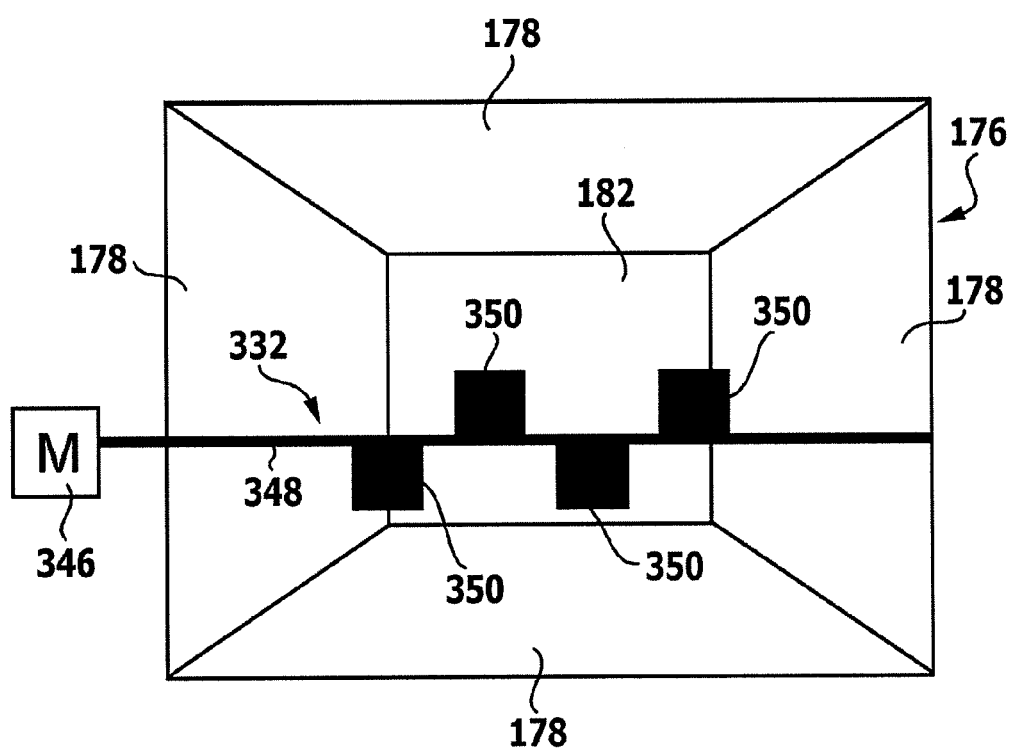
FIG. 24 a diagrammatic top view of the auxiliary-material receiving container with electrically driven shaft of FIG. 23.

An alternative embodiment of a device 332 for thoroughly mixing the material situated in the auxiliary-material receiving container 176 that is illustrated in FIGS. 23 and 24 comprises an electric motor 346, which is disposed laterally adjacent to the auxiliary-material receiving container 176 and the output shaft 348 of which is led through a side wall 178 of the auxiliary-material receiving container 176 and provided with a plurality of, for example four, paddles 350, which are arranged on the output shaft 348 in a rotationally fixed manner and so as to be mutually offset at an angular distance of for example in each case ca. 90° and in the axial direction of the output shaft 348.

By virtue of rotation of the output shaft 348 about its substantially horizontally aligned axis by means of the electric motor 346 the paddles 350 are set in rotation, with the result that the paddles 350 thoroughly mix the material situated in the auxiliary-material receiving container 176, smooth the surface of this material and break up material bridges that have arisen in the auxiliary-material receiving container 176.

The conversion of a pre-existing apparatus 126 for separating wet-paint overspray from a crude gas stream containing overspray particles may be effected using the filter modules 132 of the previously described installations 100 in the following way:

First, a part of the existing apparatus is disassembled so as to clear the space taken up by a filter module 132 in its working position.

A filter module 132 is then disposed in the working position thus cleared and is connected to the support structure for the application region 108, in particular to the booth walls 114 of the spray booth 110.

These steps are then repeated until all of the filter modules 132 are disposed in their working position and connected to the support structure for the application region 108.

In this way it is possible to replace for example an existing apparatus for the wet separation of wet-paint overspray with the previously described apparatus 126 of a modular design for the dry separation of wet-paint overspray, without the application region 108 of the installation 100 for painting vehicle bodies 102 having to be disassembled for this purpose.

The invention claimed is:

1. Method of introducing auxiliary material into the flow path of a crude gas stream charged with wet-paint overspray before the crude gas stream passes through at least one filter element for separating the overspray from the crude gas stream, wherein the auxiliary material deposits as a barrier layer on surfaces of the filter element in order to prevent these surfaces from being clogged by adhering wet-paint overspray particles, said method comprising the following method steps:
   detecting whether there is an adequate crude gas flow through the at least one filter element; and
   blocking the introduction of auxiliary material into the flow path of the crude gas stream if it is determined that there is not an adequate crude gas flow.

2. Method according to claim 1, whereby an introduction of auxiliary material into the flow path of the crude gas stream is effected by swirling auxiliary material situated in an auxiliary-material receiving container by means of a swirling device and wherein in the absence of an adequate crude gas flow the operation of the swirling device is blocked.

3. Method according to claim 1, whereby an introduction of auxiliary material into the flow path of the crude gas stream is effected by cleaning auxiliary material off at least one filter element and wherein in the absence of an adequate crude gas flow the cleaning of the at least one filter element is blocked.

4. Method according to claim 1, whereby the absence of an adequate crude gas flow is determined on the basis of a pressure drop at at least one filter element.

5. Method according to claim 4, wherein the absence of an adequate crude gas flow is detected when the pressure drop is too low.

6. Method according to claim 1, whereby the absence of an adequate crude gas flow is determined on the basis of the operating state of a blower that is disposed downstream of the at least one filter element.

7. Method according to claim 6, whereby the operating state of the blower is monitored by means of current monitoring.

8. Method according to claim 6, whereby the operating state of the blower is monitored by means of a frequency converter.

9. Method according to claim 6, whereby the operating state of the blower is monitored by means of measuring the pressure drop at the blower.

10. Method according to claim 1, whereby the absence of an adequate crude gas flow is determined by means of a flow meter.

11. Method according to claim 10, whereby there is used a flow meter that is disposed downstream of the at least one filter element.

12. Apparatus for introducing auxiliary material into the flow path of a crude gas stream charged with wet-paint overspray before the crude gas stream passes through at least one filter element for separating the overspray from the crude gas stream, wherein the auxiliary material deposits as a barrier layer on surfaces of the filter element in order to prevent these surfaces from being clogged by adhering overspray particles and wherein the apparatus comprises the following:
   a detection device for detecting whether there is an adequate crude gas flow through the at least one filter element; and
   a blocking device for blocking the introduction of auxiliary material into the flow path of the crude gas stream if the detection device determines the absence of an adequate crude gas flow.

13. Apparatus according to claim 12, whereby the apparatus comprises a control apparatus, which is used as a detection device for detecting whether there is an adequate crude gas flow and/or as a blocking device for blocking the introduction of auxiliary material into the flow path of the crude gas stream.

14. Apparatus according to claim 12, whereby the apparatus comprises at least one swirling device for swirling auxiliary material situated in an auxiliary-material receiving container and wherein the operation of the swirling device can be blocked in the absence of an adequate crude gas flow.

15. Apparatus according to claim 12, whereby the apparatus comprises a cleaning device for cleaning auxiliary material off at least one filter element and wherein the operation of the cleaning device may be blocked in the absence of an adequate crude gas flow.

16. Apparatus according to claim 12, whereby the apparatus comprises pressure sensors for measuring a pressure drop at at least one filter element.

17. Apparatus according to claim 12, whereby the apparatus comprises at least one device for monitoring the operating state of a blower that is disposed downstream of the at least one filter element.

18. Apparatus according to claim 17, whereby the apparatus comprises a current monitoring appliance for monitoring the operating state of the blower.

19. Apparatus according to claim 17, whereby the apparatus comprises a frequency converter for monitoring the operating state of the blower.

20. Apparatus according to claim 17, whereby the apparatus comprises a differential pressure gauge for measuring the pressure drop at the blower.

21. Apparatus according to claim 12, whereby the apparatus comprises at least one flow meter.

22. Apparatus according to claim 21, whereby at least one flow meter is disposed downstream of the at least one filter element.

23. Apparatus for separating wet-paint overspray from a crude gas stream containing overspray particles, comprising at least one filter element for separating the overspray from the crude gas stream and at least one apparatus for introducing auxiliary material into the flow path of the crude gas stream charged with wet-paint overspray before the crude gas stream passes through the at least one filter element for separating the overspray from the crude gas stream, wherein the apparatus for introducing auxiliary material into the flow path of the crude gas stream comprises the following:
   a detection device for detecting whether there is an adequate crude gas flow through the at least one filter element; and a blocking device for blocking the introduction of auxiliary material into the flow path of the crude gas stream if the detection device determines the absence of an adequate crude gas flow.

24. Installation for painting articles, comprising at least one application region for applying wet paint onto the articles to be painted as well as at least one apparatus for separating wet-paint overspray from a crude gas stream containing overspray particles, comprising at least one filter element for separating the overspray from the crude gas stream and at least one apparatus for introducing auxiliary material into the flow path of the crude gas stream charged with wet-paint overspray before the crude gas stream passes through the at least one filter element for separating the overspray from the crude gas stream, wherein the apparatus for introducing auxiliary material into the flow path of the crude gas stream comprises the following:

a detection device for detecting whether there is an adequate crude gas flow through the at least one filter element; and a blocking device for blocking the introduction of auxiliary material into the flow path of the crude gas stream if the detection device determines the absence of an adequate crude gas flow.

25. Installation according to claim 24, wherein the articles are vehicle bodies.

* * * * *